United States Patent
Sawachi

(10) Patent No.: US 9,554,118 B2
(45) Date of Patent: Jan. 24, 2017

(54) IMAGE PROCCESSING DEVICE, IMAGING DEVICE, AND IMAGE PROCESSING METHOD

(75) Inventor: Youichi Sawachi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 583 days.

(21) Appl. No.: 13/503,295

(22) PCT Filed: Jun. 28, 2011

(86) PCT No.: PCT/JP2011/064742
§ 371 (c)(1),
(2), (4) Date: Apr. 20, 2012

(87) PCT Pub. No.: WO2012/002354
PCT Pub. Date: Jan. 5, 2012

(65) Prior Publication Data
US 2012/0229608 A1 Sep. 13, 2012

(30) Foreign Application Priority Data
Jun. 30, 2010 (JP) .................................. 2010-150385

(51) Int. Cl.
*H04N 5/262* (2006.01)
*H04N 13/02* (2006.01)
*G03B 35/08* (2006.01)
*G02B 27/12* (2006.01)
*H04N 5/232* (2006.01)

(52) U.S. Cl.
CPC ...... *H04N 13/0239* (2013.01); *H04N 5/23296* (2013.01)

(58) Field of Classification Search
CPC .................. H04N 13/0239; H04N 5/23296

USPC ........................................................ 348/46
See application file for complete search history.

(56) References Cited

U.S. PATENT DOCUMENTS

| 5,436,682 A * | 7/1995 | Katoh et al. ..................... 353/15 |
| 6,512,892 B1 * | 1/2003 | Montgomery et al. ........ 396/326 |
| 2011/0193861 A1 * | 8/2011 | Mashitani et al. ............ 345/419 |

FOREIGN PATENT DOCUMENTS

| JP | 08-317429 | * 11/1996 | ............. H04N 13/04 |
| JP | 8-317429 A | 11/1996 | |
| JP | 2003-52058 A | 2/2003 | |
| JP | 2005-039401 A | 2/2005 | |

(Continued)

*Primary Examiner* — Hee-Yong Kim
(74) *Attorney, Agent, or Firm* — Birch, Stewart, Kolasch & Birch, LLP

(57) ABSTRACT

Stereoscopic tracking during a zooming period is facilitated to alleviate eye fatigue. An image processing device includes an imaging unit 14 that acquires a stereoscopic image including a plurality of viewpoint images, an operation unit 16 that acquires a zoom value, an electronic zoom processing unit 17 that performs magnification of the stereoscopic image by image processing on the basis of the acquired zoom value, a monitor 21 capable of outputting the magnified stereoscopic image, and a control unit 25 that outputs the stereoscopic image immediately before or immediately after a change in the zoom value to the monitor 21 as a stereoscopic still image magnified by the electronic zoom processing unit 17 while the acquired zoom value is varying, and outputs the stereoscopic image acquired by the imaging unit 14 to the monitor 21 as a stereoscopic moving image while the zoom value is not varying.

18 Claims, 25 Drawing Sheets

(56) References Cited

FOREIGN PATENT DOCUMENTS

JP 2010-081010 A 4/2010

\* cited by examiner

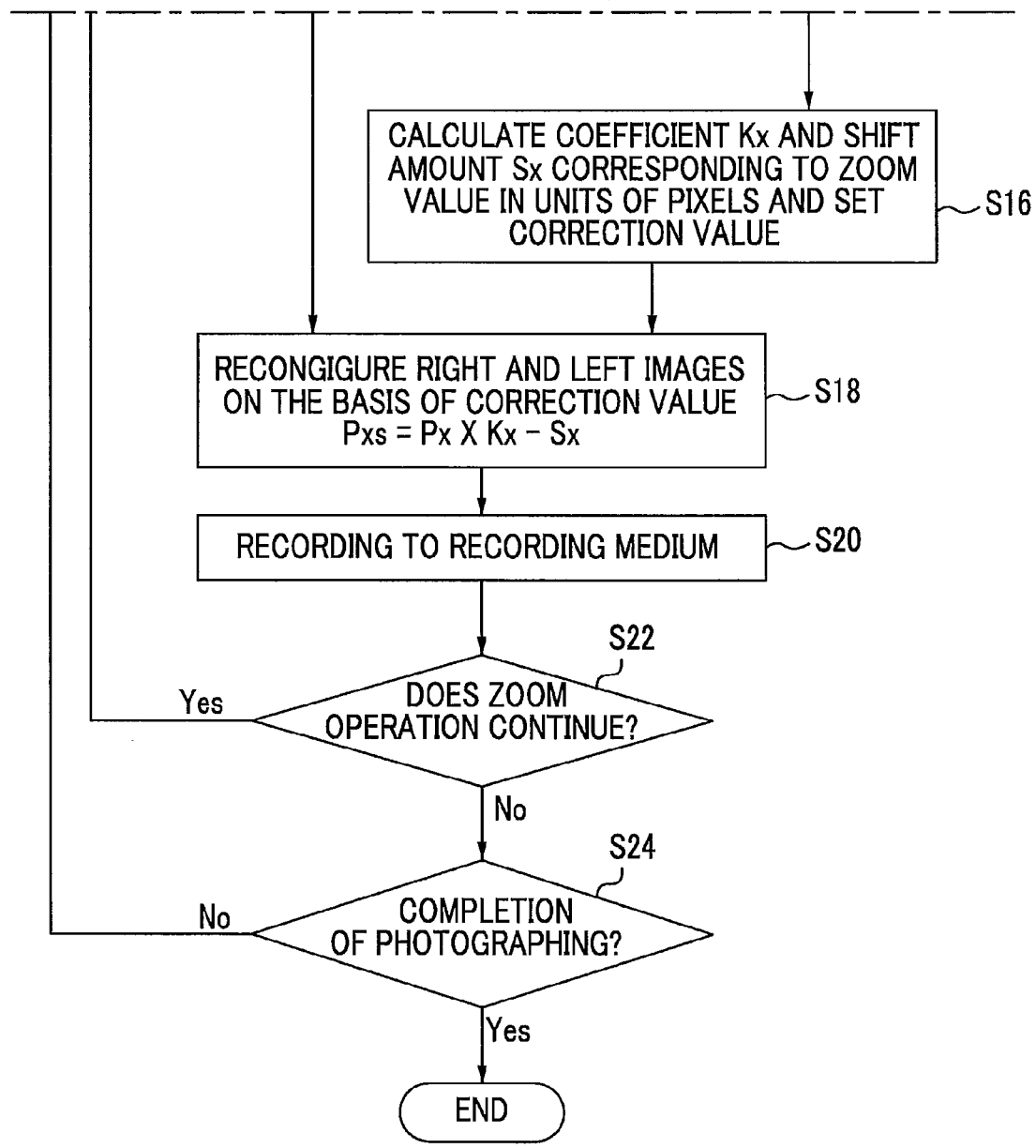

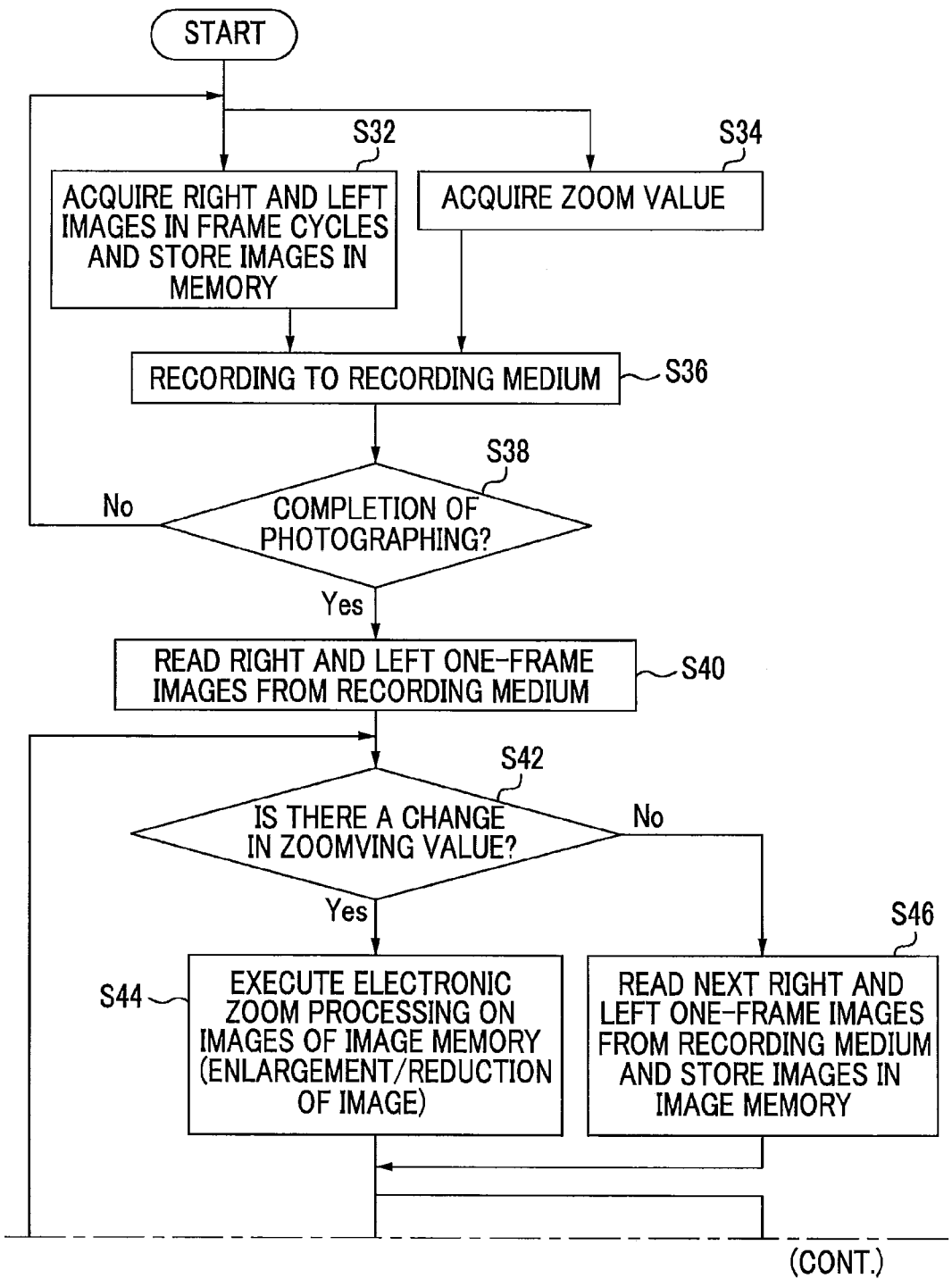

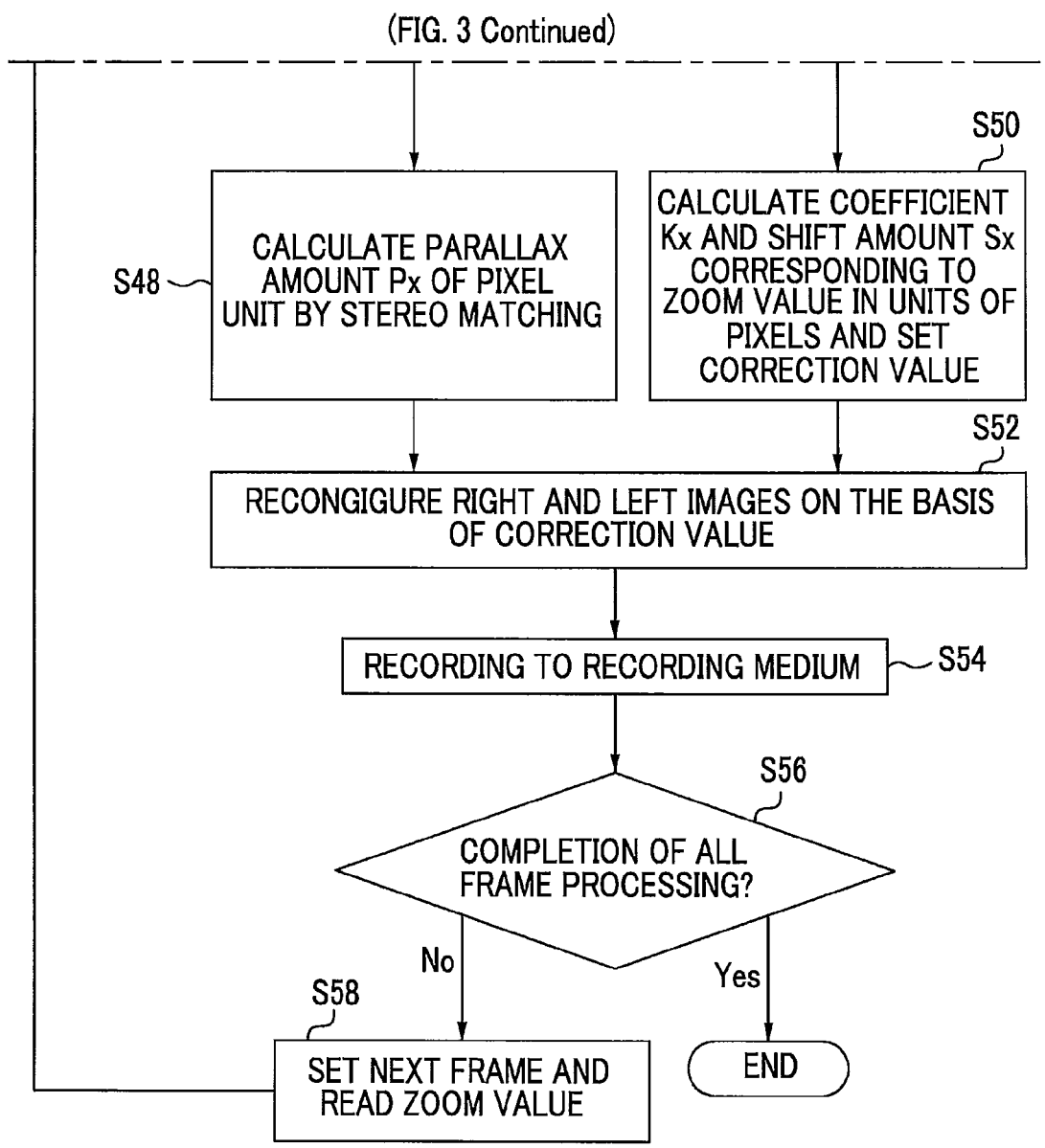

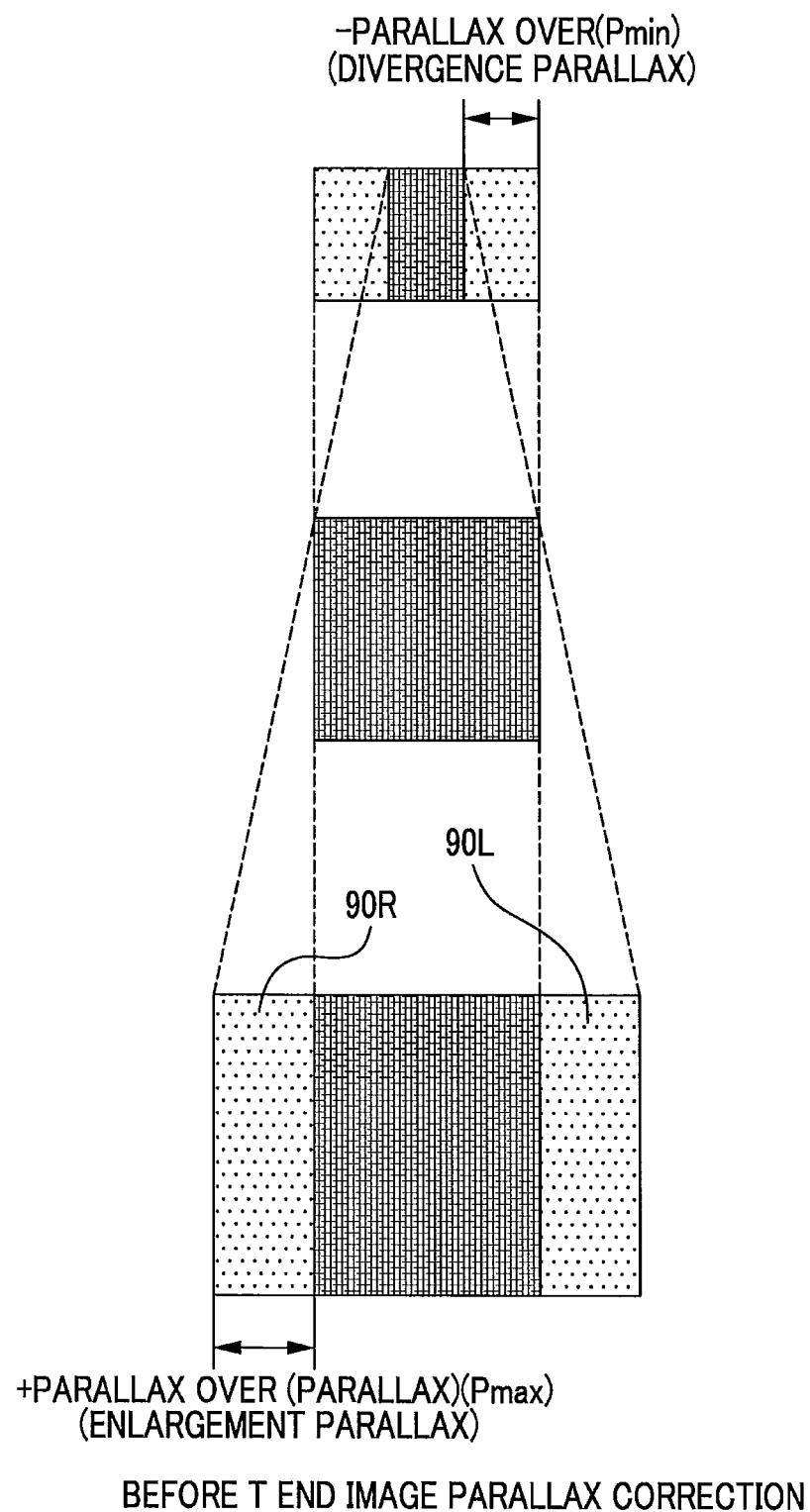

PARALLAX COMPRESSION

AFTER W END IMAGE PARALLAX CORRECTION

FIG. 9

PARALLAX AMOUNT OF CORRECTION

| ZOOM VALUE | Pmin | · | · | · | -2 | -1 | 0 | 1 | 2 | 3 | · | · | · | · | Pmax |
|---|---|---|---|---|---|---|---|---|---|---|---|---|---|---|---|
| 0 | Ptf | · | · | · | · | · | · | · | · | · | · | · | · | · | Ptn |
| 1 | · | · | · | · | · | · | · | · | · | · | · | · | · | · | · |
| 2 | · | · | · | · | · | · | · | · | · | · | · | · | · | · | · |
| 3 | · | · | · | · | · | · | · | · | · | · | · | · | · | · | · |
| · | · | · | · | · | · | · | · | · | · | · | · | · | · | · | · |
| · | · | · | · | · | · | · | · | · | · | · | · | · | · | · | · |
| 10 | · | · | · | Pwf | · | · | · | · | · | · | · | · | Pwn | · | · |

FIG. 12

| IN CASE OF 1920x1080 RESOLUTION MONITOR | |
|---|---|
| SIZE | PIXEL |
| 200 | 22 |
| 100 | 43 |
| 65 | 67 |
| 60 | 72 |
| 55 | 79 |
| 50 | 87 |
| 45 | 96 |
| 40 | 108 |

LINE ON WHICH PARALLAX BECOMES Ptn

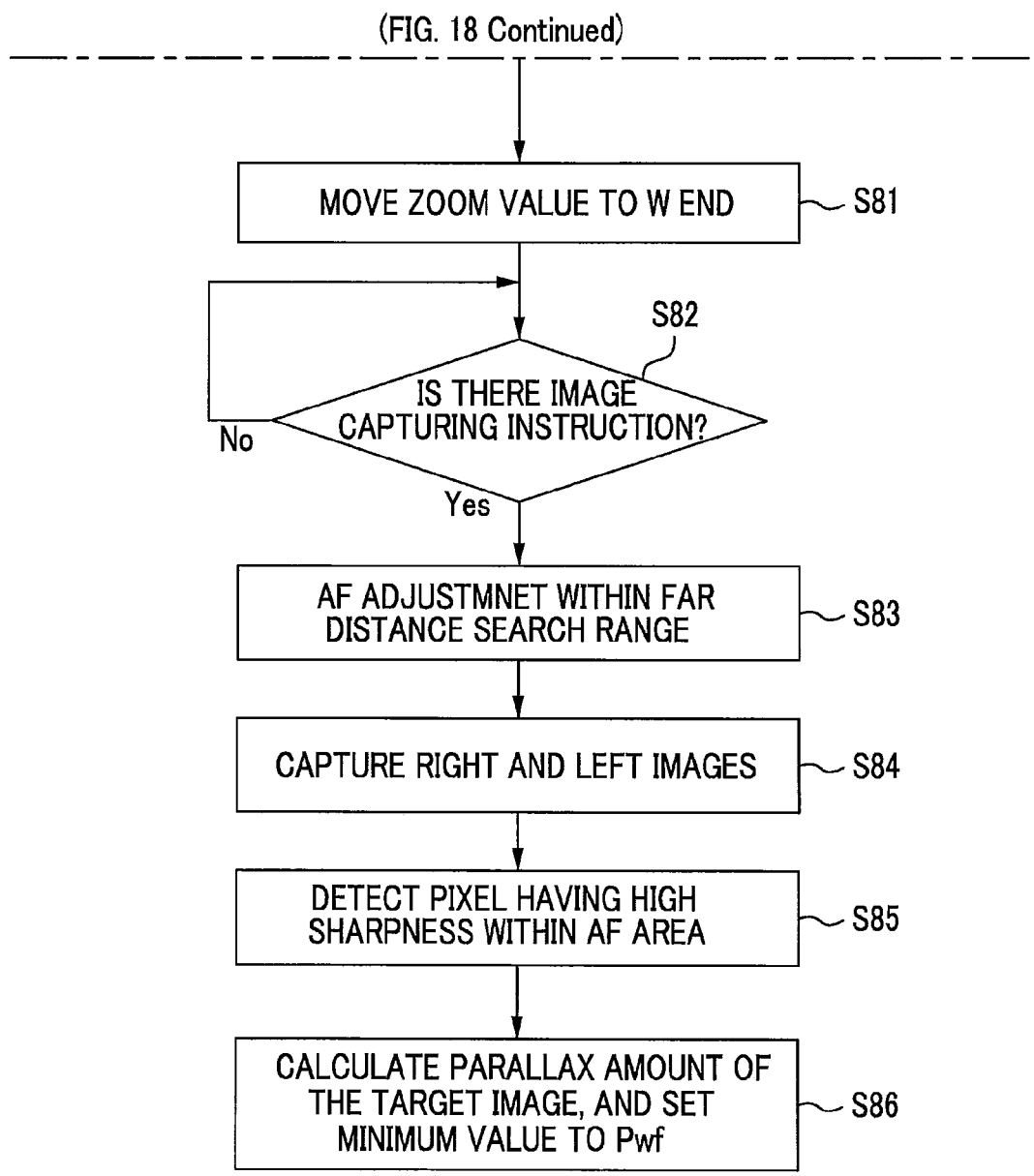

IMAGE PROCCESSING DEVICE, IMAGING DEVICE, AND IMAGE PROCESSING METHOD

BACKGROUND OF TILE INVENTION

1. Field of the Invention

The present invention relates to an image processing device, an imaging device, and an image processing method that perform magnification of a stereoscopic image including a plurality of viewpoint images.

2. Description of the Related Art

In the related art, magnification (zooming) of a stereoscopic image including a plurality of viewpoint images is performed.

JP-H08-317429A (JP1996-317429A) discloses a configuration in which the segmenting position and image horizontal phase (shift amount) of respective viewpoint images (a left eye image and a right eye image) are controlled according to the electronic zooming of a stereoscopic image, a maximum parallax amount and a minimum parallax amount are made to be within a setting range, and the depth direction of the stereoscopic image is adjusted (mainly to be fixed).

JP2003-52058A discloses aligning the center of a left eye image with the center of a right eye image according to the zoom, and controlling the shift amount of the left eye image and the shift amount of the right eye image according to the zoom to make the depth direction of the stereoscopic image variable.

SUMMARY OF THE INVENTION

However, image processing during zooming is not at all described in JP-H08-317429A and JP2003-52058A.

Stereoscopic tracking of a person is apt to become difficult during zooming. As a result, there is a problem that an extremely uncomfortable feeling on vision is visually caused and fatigue increases.

The invention has been made in view of such a situation, and an object thereof is to provide an image processing device, an imaging device, and an image processing method capable of facilitating stereoscopic tracking during a zooming period, and alleviating eye fatigue.

In order to achieve the above object, the invention provides an image processing device including an image acquisition means that acquires a stereoscopic image including a plurality of viewpoint images; a zoom value acquisition means that acquires a zoom value; an electronic zoom means that performs magnification of the stereoscopic image acquired by the image acquisition means through image processing on the basis of the zoom value acquired by the zoom value acquisition means; an output means capable of outputting the stereoscopic image magnified by the electronic zoom means; and a control means that outputs the stereoscopic image immediately before or immediately after a change in the zoom value to the output means as a stereoscopic still image magnified by the electronic zoom means while the zoom value acquired by the zoom value acquisition means is varying, and outputs the stereoscopic image acquired by the image acquisition means to the output means as a stereoscopic moving image while the zoom value is not varying.

That is, since the stereoscopic image immediately before or immediately after a change during a zooming period in which the zoom value continues changing is electronically zoomed and output as a stereoscopic still image, and, except the zooming period, is output as a stereoscopic moving image, stereoscopic tracking during the zooming period can be facilitated, and eye fatigue can be alleviated.

In one embodiment of the invention, preferably, the control means makes the display time of the magnified still image longer than the fluctuation period of the zoom value.

In one embodiment of the invention, preferably, the control means gradually changes the zoom value to gradually output a magnified stereoscopic still image by the output means.

In one embodiment of the invention, preferably, the control means performs switching of the stereoscopic still image through fade-in and fade-out of an image.

In one embodiment of the invention, preferably, the image processing device further includes a parallax amount calculating means that calculates the parallax amount of each pixel among the plurality of viewpoint images; and a parallax amount correcting means that corrects the parallax amounts of at least some pixels of the stereoscopic image acquired by the image acquisition means, according to the parallax amount calculated by the parallax amount calculating means and the zoom value acquired by the zoom value acquisition means. The stereoscopic still image of which the parallax amount is corrected by the parallax amount correcting means is output by the output means.

In one embodiment of the invention, preferably, the parallax amount correcting means performs the correction of changing the amount of a change in the parallax amount to the amount of a change in the zoom value per unit, on the plurality of viewpoint images.

In one embodiment of the invention, preferably, the parallax amount correcting means corrects the parallax amount such that the parallax amount of a subject with the same subject distance decreases if the zoom value changes from the wide angle side toward the telephoto side in the stereoscopic image before correction, and the parallax amount of the subject with the same subject distance increases or becomes constant if the zoom value changes from the wide angle side toward the telephoto side in the stereoscopic still image after correction.

In one embodiment of the invention, preferably, the parallax amount correcting means multiplies the parallax amount before correction by a coefficient and shifts the parallax amount after the multiplication, to correct the parallax amount.

In one embodiment of the invention, preferably, the parallax amount correcting means corrects the parallax amount such that the shift amount of the parallax amount becomes large from the telephoto end to the wide angle end.

In one embodiment of the invention, preferably, the parallax amount correcting means corrects the parallax amount such that the parallax amount of a subject with the same subject distance increases nonlinearly if the zoom value changes from a wide angle end to a telephoto end.

In one embodiment of the invention, preferably, the parallax amount correcting means corrects the parallax amount so as to fall within a range of specific upper limit to a specific lower limit.

In one embodiment of the invention, preferably, the image processing device further includes a setting information input means that receives input of setting information for determining a parallax amount correction value to be used for the correction of the parallax amount; and a parallax amount correction value calculating means that calculates the parallax amount correction value on the basis of the setting information input by the setting information input means.

In one embodiment of the invention, preferably, the setting information is the display size of the stereoscopic image.

In one embodiment of the invention, preferably, the image processing device further includes a parallax amount correction value calculating means that sets the zoom value to the telephoto end or the wide angle end, and calculates the correction value of the parallax amount on the basis of the parallax amount of a focused pixel.

In one embodiment of the invention, preferably, the setting information includes at least one of subject distance information on the nearest subject and subject distance information on the farthest subject.

In one embodiment of the invention, preferably, the image processing device further includes a zoom effect setting information input means that receives input of zoom effect setting information for determining the amount of a change in the parallax amount to the amount of a change in the zoom value per unit, and a parallax amount correction value calculating means that calculates the parallax amount correction value on the basis of the zoom effect setting information input by the setting information input means.

Additionally, the invention provides an imaging device including the image processing device. Here, the image acquisition means includes an imaging lens including a zoom lens, and an imaging element that captures a subject image focused by the imaging lens.

Additionally, the invention provides an image processing method using an image acquisition means that acquires a stereoscopic image including a plurality of viewpoint images, a zoom value acquisition means that acquires a zoom value, an electronic zoom means that performs magnification of the stereoscopic image acquired by the image acquisition means through image processing on the basis of the zoom value acquired by the zoom value acquisition means, and an output means capable of outputting the stereoscopic image. The stereoscopic image immediately before or immediately after a change in the zoom value is output to the output means as a stereoscopic still image magnified by the electronic zoom means while the zoom value acquired by the zoom value acquisition means is varying, and the stereoscopic image acquired by the image acquisition means is output to the output means as a stereoscopic moving image while the zoom value is not varying.

According to the invention, stereoscopic tracking during a zooming period can be facilitated to alleviate eye fatigue.

BRIEF DESCRIPTION OF THE DRAWINGS

FIG. 3 is a flowchart showing the flow of an example of image processing that is performed after a moving image is photographed.

FIGS. 8A to 8D are views showing a left eye image and a right eye image before parallax correction, after parallax compression, after shift, and after parallax correction.

FIG. 9 is a view showing an example of table data specifying the correspondence relationship among zoom values, parallax amounts before parallax correction, and parallax amounts before parallax correction.

FIG. 12 is a view showing the correspondence relationship between display sizes and pixels of a monitor.

DESCRIPTION OF THE PREFERRED EMBODIMENTS

Embodiments of the invention will be described below in detail with reference to the accompanying drawings.

First Embodiment

Figure 1:
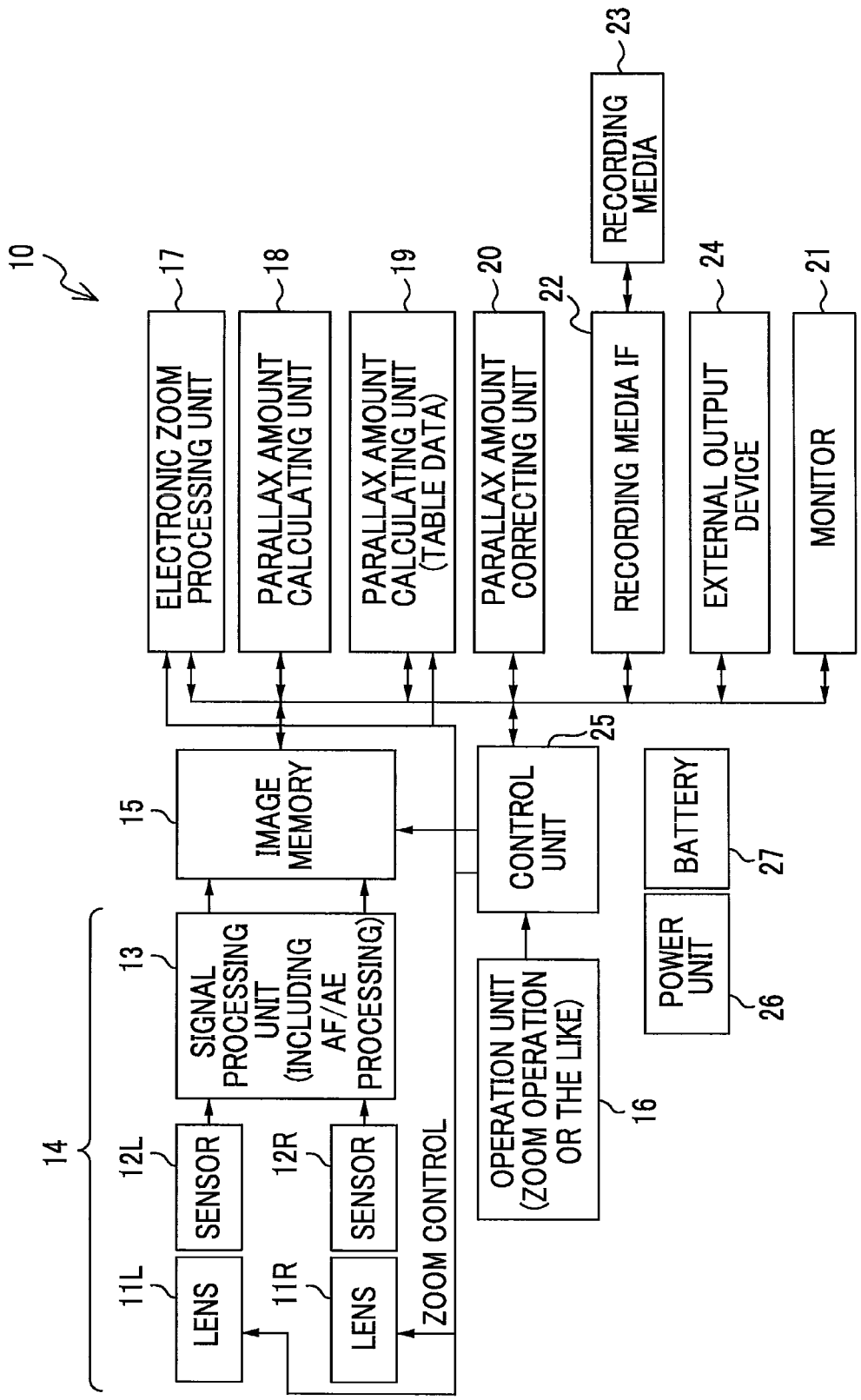
FIG. 1 is a block diagram showing a configuration example of an imaging device related to the invention.

FIG. 1 is a block diagram showing a configuration example of an imaging device related to the invention.

The imaging device 10 includes imaging lenses 11L and 11R, imaging sensors 12L and 12R, a signal processing unit 13, an image memory 15, an operation unit 16, an electronic zoom processing unit 17, a parallax amount calculating unit 18, a parallax amount correction value calculating unit 19, a parallax amount correcting unit 20, a monitor 21, a recording medium interface 22, a recording medium 23, an external output device 24, a control unit 25, a power unit 26, and a battery 27.

The imaging lenses 11L and 11R are including an optical system that forms subject images on light-receiving surfaces of the imaging sensors 12L and 12R. The imaging lenses 11L and 11R of this example include a focus lens, a zoom lens, and an aperture device.

The imaging sensors 12L and 12R capture subject images imaged by the imaging lenses 11L and 11R, respectively. The imaging sensors 12L and 12R are constituted by, for example, a CCD imaging sensor, a CMOS imaging sensor, or the like.

The signal processing unit 13 performs various kinds of signal processing, such as AE processing and AF processing, on a stereoscopic image (a left eye image and a right eye image) output from the imaging sensors 12L and 12R.

In the imaging devices 10 of this example, an imaging unit 14 (image acquisition means) that acquires a stereoscopic image including a plurality of viewpoint images is constituted by the imaging lenses 11L and 11R, the imaging sensors 12L and 12R, and the signal processing unit 13.

The image memory 15 is a memory (for example, RAM) that temporarily stores a stereoscopic image output from the signal processing unit 13 for each frame.

The operation unit 16 is an input device (for example, key switch) that receives user's input operations.

In the imaging device 10 of this example, a zoom value acquisition unit that acquires a zoom value that changes arbitrarily is constituted by the operation unit 16.

The electronic zoom processing unit 17 magnifies a stereoscopic image (a left eye image and a right eye image) by an image processing on the basis of the zoom value acquired by the operation unit 16.

The parallax amount calculating unit 18 calculates the parallax amounts of respective pixels among a plurality of viewpoint images (a left eye image and a right eye image).

The parallax amount correction value calculating unit 19 calculates a parallax amount correction value for correcting the parallax amount of each pixel of a stereoscopic image (a left eye image and a right eye image) according to the parallax amount calculated by the parallax amount calculating unit 18 and the zoom value acquired by the operation unit 16.

The parallax amount correcting unit 20 corrects the parallax amount of each pixel of a stereoscopic image (a left eye image and a right eye image) on the basis of the parallax amount correction value calculated by the parallax amount correction value calculating unit 19. That is, the parallax amount of each pixel of a stereoscopic image is corrected according to the parallax amount calculated by the parallax amount calculating unit 18 and the zoom value acquired by the operation unit 16. The amount of a change in the parallax amount to the amount of a change in the zoom value per unit is changed by this correction of the parallax amount. Specifically, the parallax amount correcting unit 20 corrects the parallax amount such that the parallax amount of a subject with the same subject distance decreases if the zoom value changes from the wide angle side toward the telephoto side in the stereoscopic image before correction, and the parallax amount of the subject with the same subject distance increases or becomes constant if the zoom value changes from the wide angle side toward the telephoto side in the stereoscopic image after correction. In addition, the parallax amount correction is not particularly limited when being performed over the entire region of a stereoscopic image, and at least a portion of the stereoscopic image may be corrected.

The monitor 21, the recording medium interface 22, and the external output device 24 output a stereoscopic image.

The monitor 21 is a display device that can stereoscopically display a stereoscopic image.

The recording medium interface 22 is an example of the external output device 24, and records a stereoscopic image on the recording medium 23, such as a memory card.

The external output device 24 is constituted by, for example, a communication interface that outputs a stereoscopic image by communication (transmission).

The control unit 25 controls respective units of the imaging device 10. The control unit 25 of this example magnifies one frame of a stereoscopic image immediately before or immediately after a change in the zoom value the electronic zoom processing unit 17 to output the magnified still image (stereoscopic still image) of one frame as a still image by the external output device while the zoom value acquired by the operation unit 16 is varying, 24, and outputs the stereoscopic image as a moving image by the external output device 24 while the zoom value is not varying.

Additionally, the control unit 25 makes the display time of the magnified still image longer than the fluctuation period of the zoom value.

Additionally, the control unit 25 gradually increases the zoom value to gradually output a magnified stereoscopic still image by an output means, such as the monitor 21.

Additionally, the control unit 25 switches a plurality of magnified still images through fade-in and fade-out.

The power unit 26 performs power supply from the battery 27 to the respective units of the imaging device 10.

Figure 2:
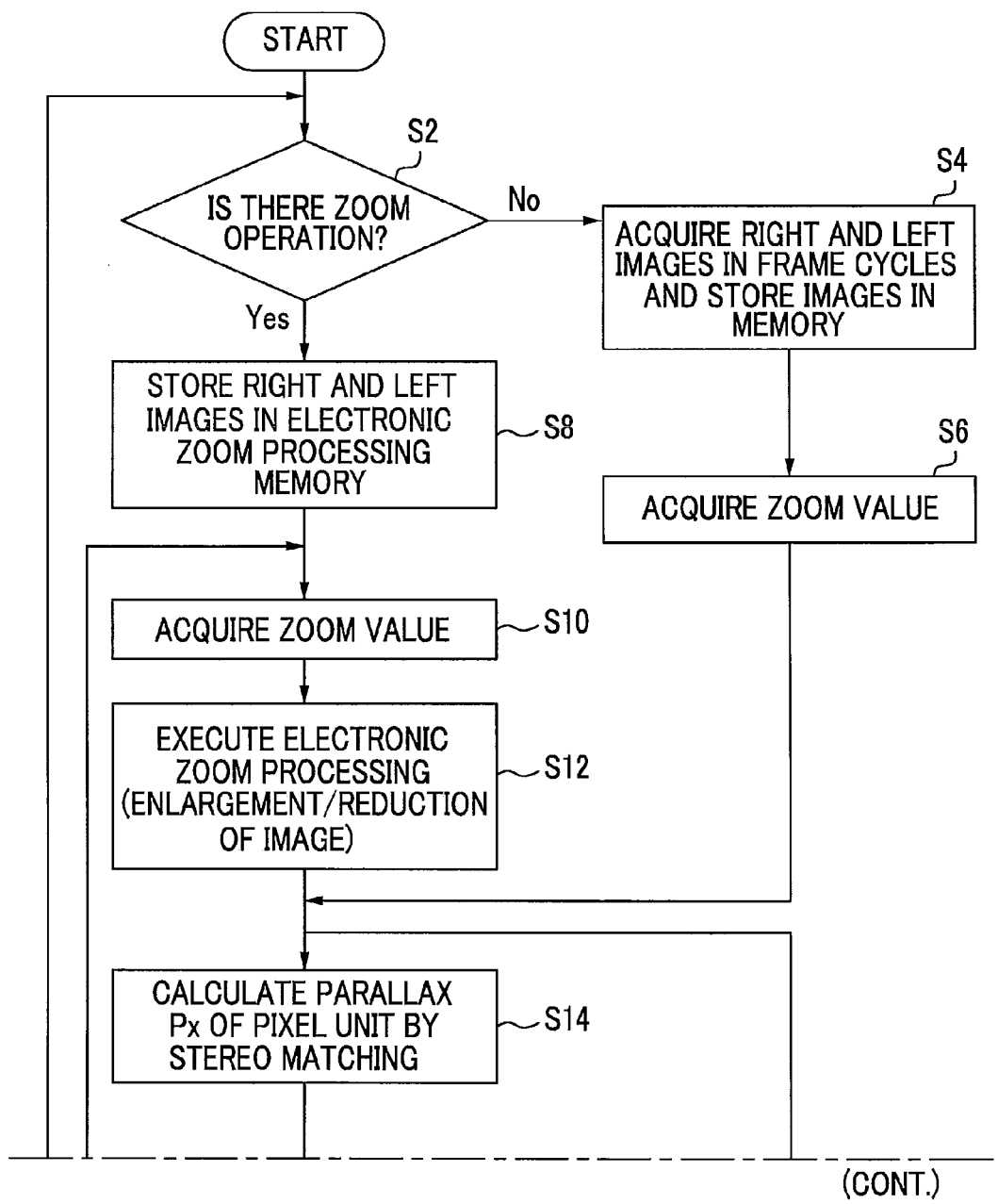
FIG. 2 is a flowchart showing the flow of an example of image processing that is performed in real time when a moving image is photographed.

FIG. 2 is a flowchart showing the flow of an example of image processing that is performed in real time when a moving image is photographed. This processing is performed according to a program by the control unit 25.

First, the presence of a zoom operation by the operation unit 16 is determined (Step S2). If there is no zoom operation, a stereoscopic image (a left eye image and a right eye image) is acquired in one-frame cycle by the imaging unit 14, and is stored in the image memory 15 (Step S4), and a zoom value is acquired from the operation unit 16 (Step S6). The zoom value changes arbitrarily from a wide angle end to a telephoto end. In the subsequent processing, processing is also performed for each frame.

If there is a zoom operation, one frame of a stereoscopic image (a left eye image and a right eye image) at the time of the zoom operation (before a change in the zoom value) is stored in a memory for electronic zoom (Step S8), a zoom value is acquired from the operation unit 16 (Step S10), and the stereoscopic image stored in the image memory 15 is magnified (enlarged or reduced) by the electronic zoom processing unit 17 according to the acquired zoom value (Step S12). The memory for the electronic zoom may be built in the electronic zoom processing unit 17, or the image memory 15 may be used so as to be divided into a memory for a stereoscopic image of real time and the memory for electronic zoom.

Next, the parallax amount Px in units of pixels is calculated by the parallax amount calculating unit 18 by performing corresponding point detection by stereo matching between a left eye image and a right eye image (Step S14).

Additionally, the parallax amount correction value calculating unit 19 calculates a parallax amount correction value for correcting the parallax amount of each pixel of a stereoscopic image according to the parallax amount of each pixel of the stereoscopic image calculated by the parallax amount calculating unit 18 and the zoom value acquired by the operation unit 16 (Step S16).

Next, the parallax amount correcting unit 20 performs reconfiguration of a left eye image and a right eye image on the basis of the correction value (Step S18). Here, the parallax amount of each pixel is corrected according to the parallax amount of each pixel calculated by the parallax amount calculating unit 18 and the zoom value acquired by the operation unit 16. The amount of a change in the parallax amount of the stereoscopic image to the amount of a change in the zoom value per unit is changed by this correction of the parallax amount. That is, the correspondence relationship between the amount of a change in the zoom value and the amount of a change in the parallax amount is changed.

Specifically, the parallax amount is corrected such that the parallax amount of a subject with the same subject distance decreases if the zoom value changes from the wide angle side toward the telephoto side in the stereoscopic image before correction, and the parallax amount of the subject with the same subject distance increases (or does not vary) if the zoom value changes from the wide angle side toward the telephoto side in the stereoscopic image after correction.

Next, the reconfigured stereoscopic image is recorded on the recording medium 23 by the recording medium interface 22. The stereoscopic image is output by the monitor 21 and the external output device 24.

Next, it is determined whether or not the zoom operation continues (Step S22). If the zoom operation continues, the processing returns to Step S10.

Further, either completion of photographing or continuation of photographing is determined (Step S24). If photographing continues, the processing returns to Step S2.

In this processing, a stereoscopic image (stereoscopic still image) for one frame immediately before or immediately after a change in the zoom value is magnified by the electronic zoom processing unit 17 and output to the monitor 21 while the zoom value acquired is varying, and stereoscopic images (stereoscopic images) for a plurality of frames are output to the monitor 21 while the acquired zoom value is not varying.

FIG. 3 is a flowchart showing the flow of an example of image processing when the image processing is performed after moving image photographing.

Steps S32 and S34 are the same as Steps S4 and S6 of FIG. 2, respectively.

In Step S36, the stereoscopic image including a left eye image and a right eye image is recorded on the recording medium 23 for each frame by the recording medium interface 22. Here, the recording medium interface 22 adds zoom value information to the stereoscopic image and records the image on the recording medium 23, for each frame.

In Step S38, either completion of photographing or continuation of photographing is determined. If photographing continues, the processing returns to Step S32 and Step S34.

After the completion of moving image photographing, in Step S40, the stereoscopic image (a left eye image and a right eye image) and the zoom value information are read frame by frame from the recording medium by the recording medium interface 22.

In Step S40, the stereoscopic image and the zoom value information for one frame are read from the recording medium 23 by the recording medium interface 22.

In Step S42, the presence of a change in the zoom value is determined.

If there is a change in the zoom value, in Step S44, the stereoscopic image in the image memory 15 is magnified (enlarged or reduced) by the electronic zoom processing unit 17.

If there is no change in the zoom value, in Step S46, the stereoscopic image (a left eye image and a right eye image) for the next one frame is read from the recording medium 23, and stored in the image memory 15.

Steps S48, S50, S52, and S54 are the same as Steps S14, S16, and S18 of FIG. 2, respectively.

In Step S56, it is determined whether all the frame processing is completed. If all the frame processing is not completed, attention is paid to the next frame, a zoom value is read from the image memory 15 (S58), and the processing returns to Step S40. This processing is ended when all the frames are completed.

Figure 4:
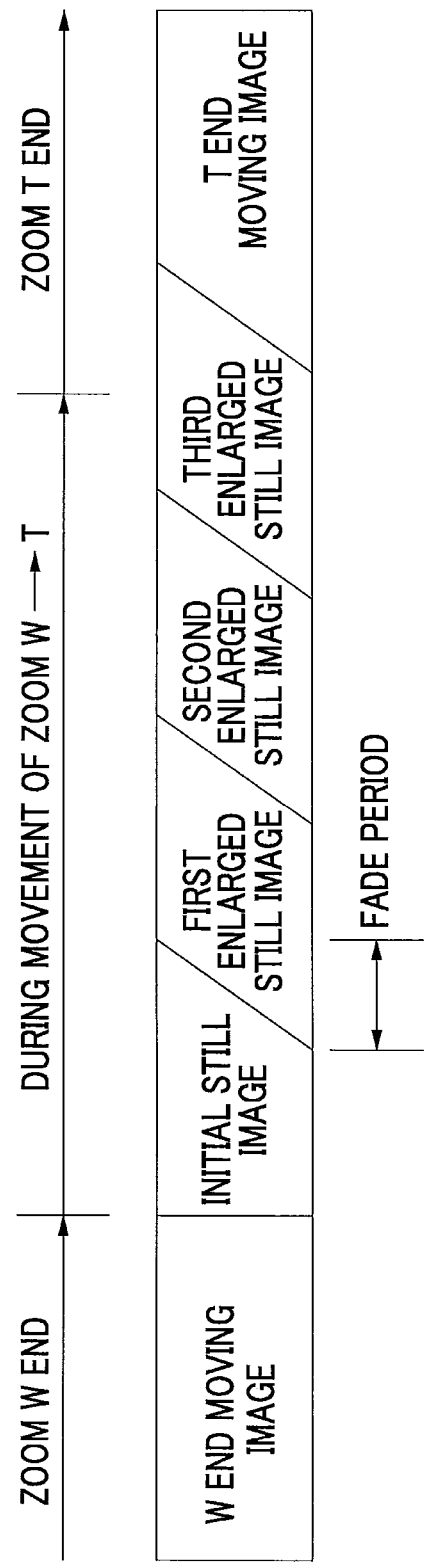
FIG. 4 is an explanatory view used for description of electronic zoom of a still image.

As shown in FIG. 4, the control unit 25 performs the control of dividing a period during a change in the zoom value into a plurality of periods, and switching the amount of a change in the zoom value to not a continuous change but a gradual change, thereby displaying and recording in order the plurality of still images gradually magnified in a period during a change in the zoom value.

Additionally, the control unit 25 makes a total display time of the plurality of magnified still images longer than the fluctuation period of the zoom value.

Figure 5:
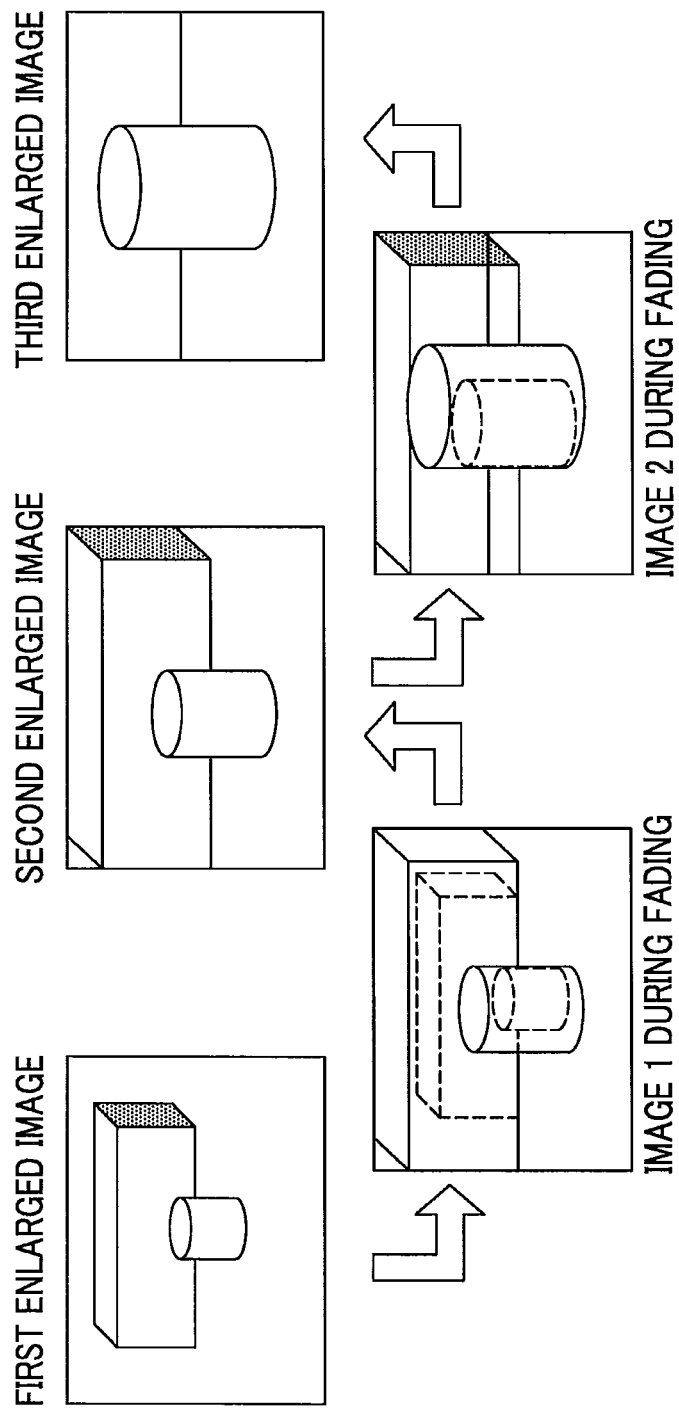
FIG. 5 is an explanatory view used for description of fading display of a still image.

Additionally, as shown in FIG. 5, the control unit 25 performs switching of the display between the plurality of still images in the monitor 21 through fade-in and fade-out. That is, the control of making the other still image displayed through fade-in while making one still image displayed through fade-out.

Figure 6:
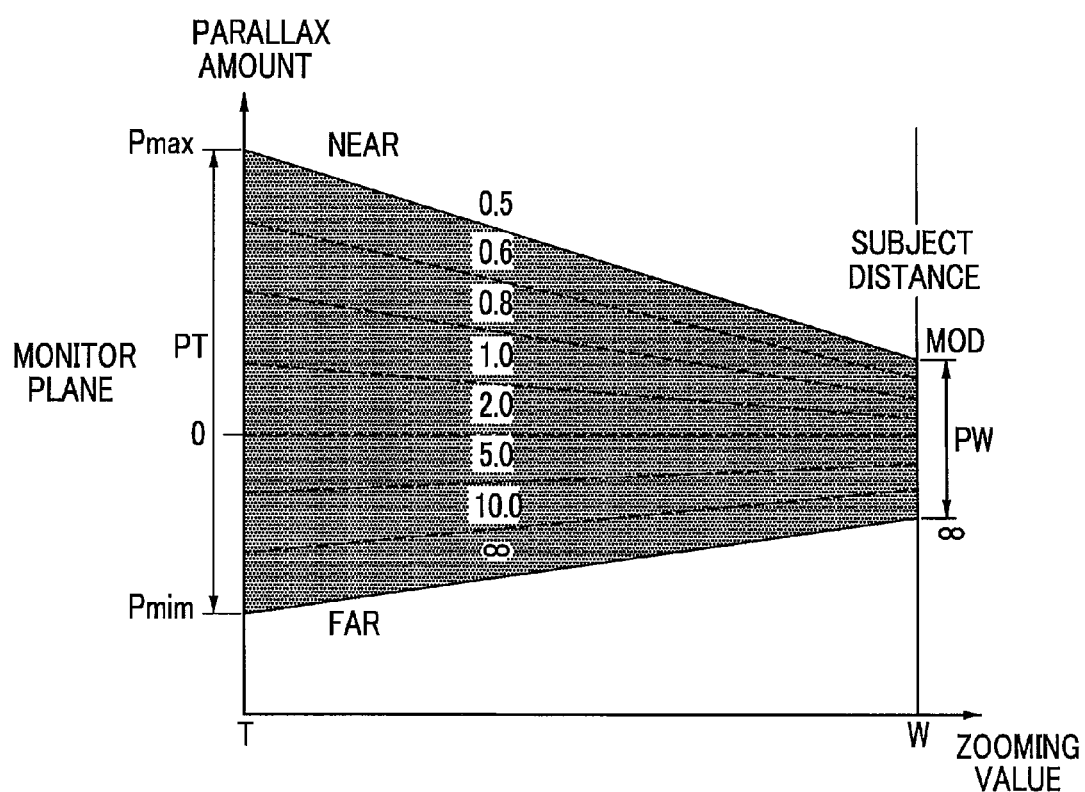
FIG. 6 is a view showing the correspondence relationship between zoom values and parallax amounts before parallax correction.

FIG. 6 shows the correspondence relationship (referred to as "parallax distribution") between zoom values and parallax amounts in viewpoint images (a left eye image, a right eye image) before parallax correction. The horizontal axis represents zoom values and the vertical axis represents parallax amounts. That is, a change (parallax distribution) in the parallax amount to a change in the zoom value is shown.

In FIG. 6, the center of the vertical axis is the parallax (=0) of a convergence point, and the distance of the convergence point is set to 2.0 m in this imaging device. In this parallax distribution, the side above the center the vertical axis shows the parallax of a subject at a nearer distance than the convergence point, and the side below than the center of the vertical axis shows the parallax of a subject at a farther distance than the convergence point. The upper edge of the parallax distribution shows a parallax change when the subject distance is 0.5 m (MOD), and the lower edge thereof shows a parallax change when the subject distance is an infinite distance.

In FIG. 6, the condition under which the parallax becomes largest are a zoom T end where the subject distance is 0.5 m, and the parallax amount under the condition becomes Pmax. Under this condition, a stereoscopic image is brought into a state where the image pops out of the monitor the most. As a result, there is high possibility that an excessive parallax at which stereoscopic viewing fusion is difficult is brought about. On the other hand, the condition under which the parallax becomes smallest is a zoom W end where the subject distance is an infinite far distance, and the parallax amount under the condition becomes Pmin. Under this condition, a stereoscopic image is brought into a state where the image recedes into the monitor the most. As a result, there is high possibility that the deviation amount of the stereoscopic image on the monitor exceeds (diverges) the width of both eyes of a person. Accordingly, it is necessary to set the upper limit and lower limit of the parallax amount through parallax correction.

In FIG. 6, a subject whose subject distance is 2 m is parallax zero irrespective of a change in the zoom value, and does not have a change in the parallax amount. When the zoom value is changed from the W side to the T side, the parallax amount of a subject with a larger (farther) subject distance than 2 m becomes small. That is, since an extremely unnatural vision that a subject image recedes into a monitor surface while becoming large is provided, fatigue of the eyes of an observer who is doing stereoscopic viewing is increased.

Figure 7:
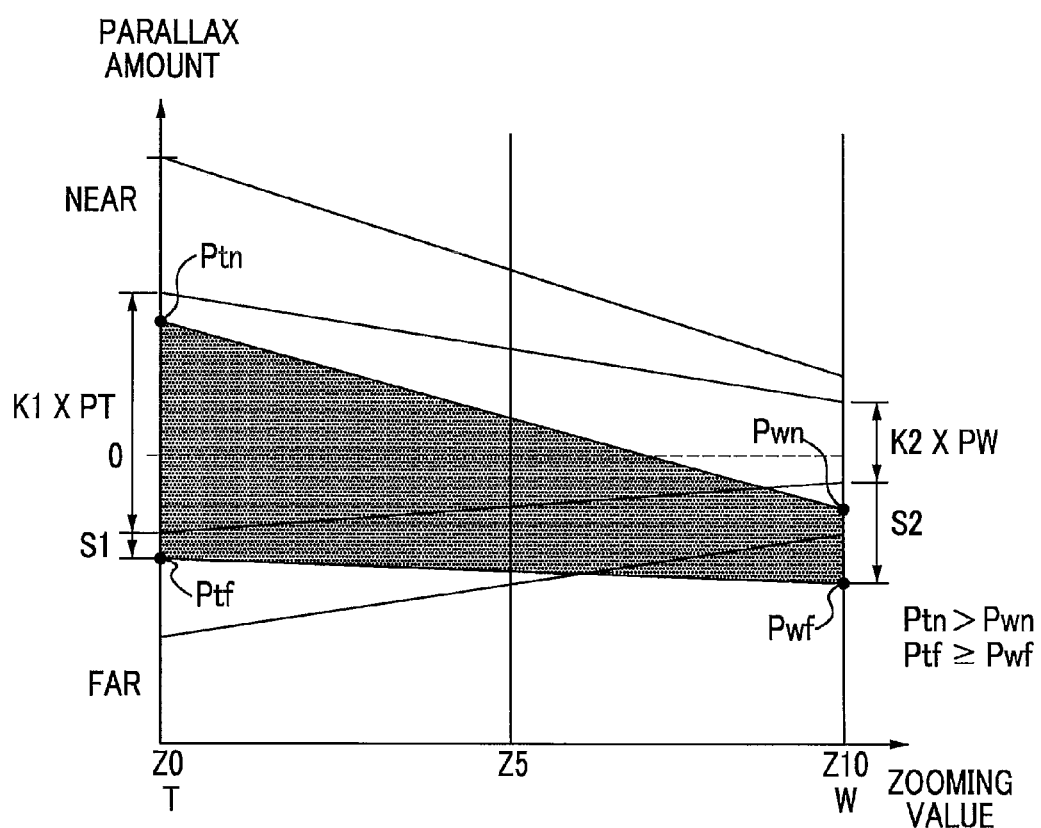
FIG. 7 is a view showing the correspondence relationship between zoom values and parallax amounts after parallax correction.

FIG. 7 shows the correspondence relationship (referred to as "parallax distribution") between zoom values and parallax amounts in viewpoint images by the parallax amount correcting unit 20. The parallax amount correcting unit 20 corrects a maximum parallax amount to Ptn from Pmax before correction, corrects a minimum parallax amount to Pwf from Pmin, and corrects the parallax amount of each zoom value so as to fall between Ptn and Pwf. In addition, there may be Ptf=Pwf.

In order to change (correct) the parallax distribution shown in FIG. 6 and the parallax distribution shown in FIG. 7, the parallax amount correction value calculating unit 19 calculates a coefficient k by which the parallax amount is multiplied, and the shift amount S of the parallax amount. The parallax amount correcting unit 20 multiplies the parallax amount of each pixel by the coefficient k, to compress the parallax distribution width in each zoom value by k times. Specifically, when a parallax amount maximum value is Pmax>Ptn before correction, it is determined that k is determined so as to become Pmax≤Ptn after correction, and 0<k<1 is set. In addition, when the parallax amount maximum value is Pmax≤Ptn before the correction, k≥1 may be set.

Next, the parallax amount correcting unit 20 shifts the parallax amount of each pixel after S1 is subtracted therefrom such that the parallax amount maximum value Pmax becomes Ptn. Such coefficient multiplication and shift are performed on each zoom value.

Additionally, The parallax amount correcting unit 20 increases the shift amount of the parallax amount as the zoom value changes from the T end to the W end in order to acquire a natural zoom effect, and as a result, Ptf≥Pwf and Ptn>Pwn are established. That is, the minimum parallax amount is set to Pwf.

Figure 8B:
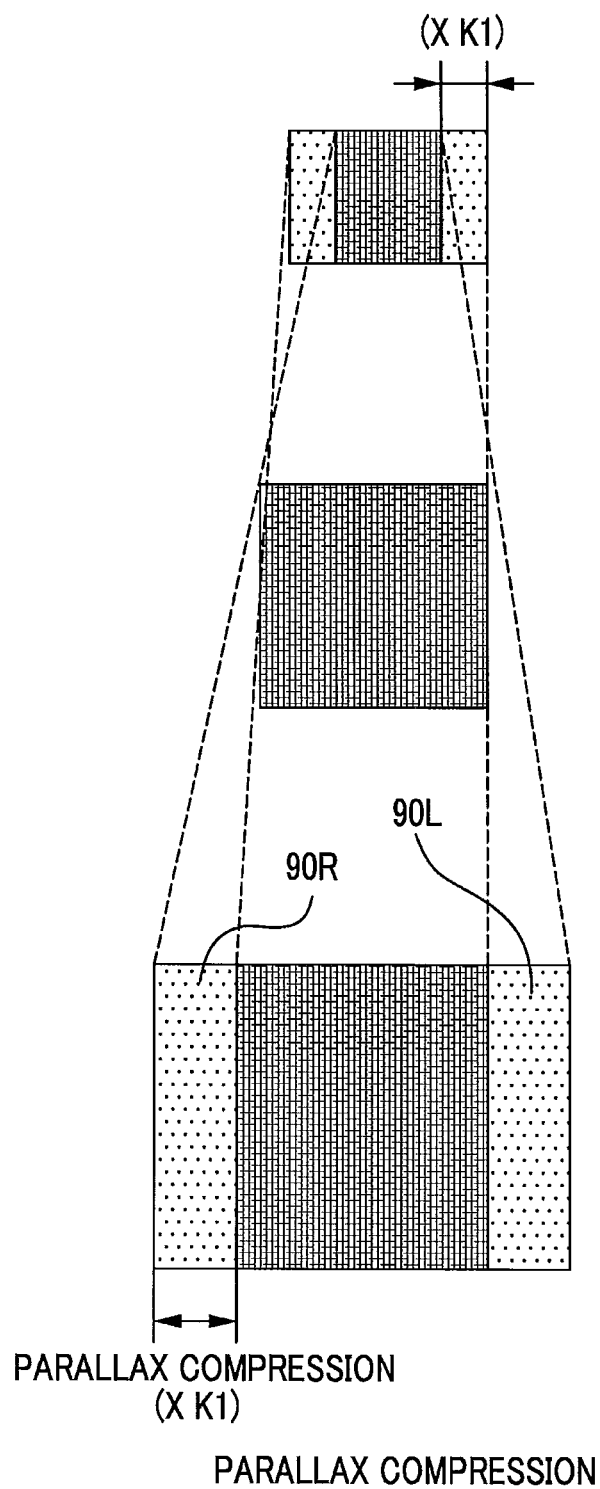
Figure 8C:
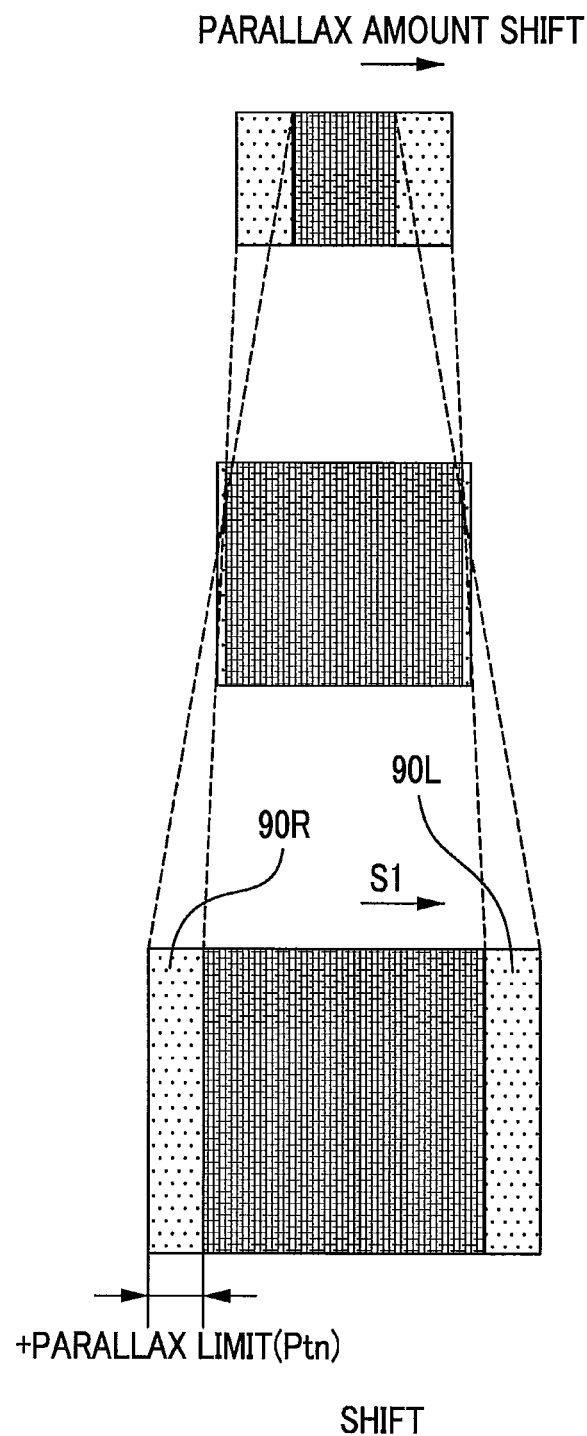
Figure 8D:
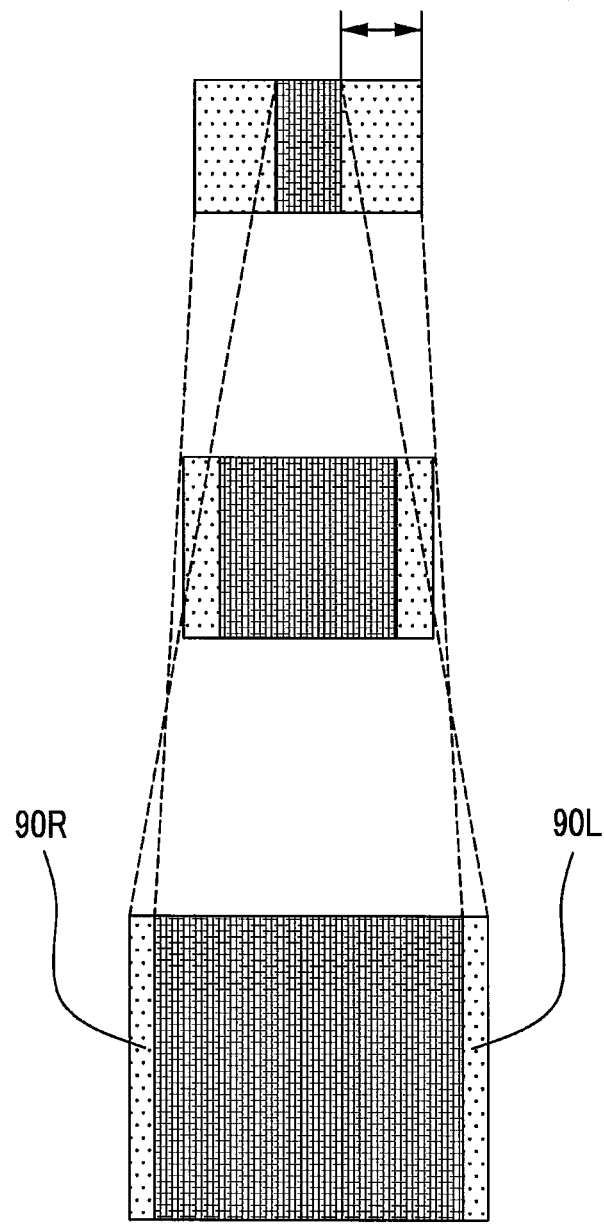

FIG. 8A shows a left eye image 90L and a right eye image 90R of the T end before parallax correction, and FIG. 8B shows a subject image 90L in a left eye image of the T end after parallax compression (coefficient multiplication), and a subject image 90R in the right eye image. FIG. 8C shows a subject image 90L in a left eye image and a subject image 90R in a right eye image at the T end after shift. FIG. 8D shows a subject image 90L in a left eye image and a subject image 90R in a right eye image at the W end after parallax correction. In addition, although a quadrangular subject image is shown in FIGS. 8A to 8D, the shape of a subject image is not limited in practice.

In FIG. 8A, excessive parallax and divergence parallax are given. Therefore, the parallax amount of a stereoscopic image after zoom falls within a parallax limit by performing the parallax compression by the multiplication of the coefficient k1 to the parallax amount as shown in FIG. 8B, and the parallax amount shift S1 as shown in FIG. 8C.

In addition, the processing sequence of the multiplication and the subtraction may be arbitrary. Additionally, if correction is determined in advance as shown in FIG. 7, as shown in FIG. 9, the processing time can be shortened by storing the correspondence relationship among zoom values, parallax amounts before parallax correction, and parallax amounts after parallax correction as table data, and performing parallax correction using the table data when parallax correction is made. That is, the parallax amount correction value calculating unit 19 of FIG. 1 may be substituted with the table data of FIG. 8.

Figure 10:
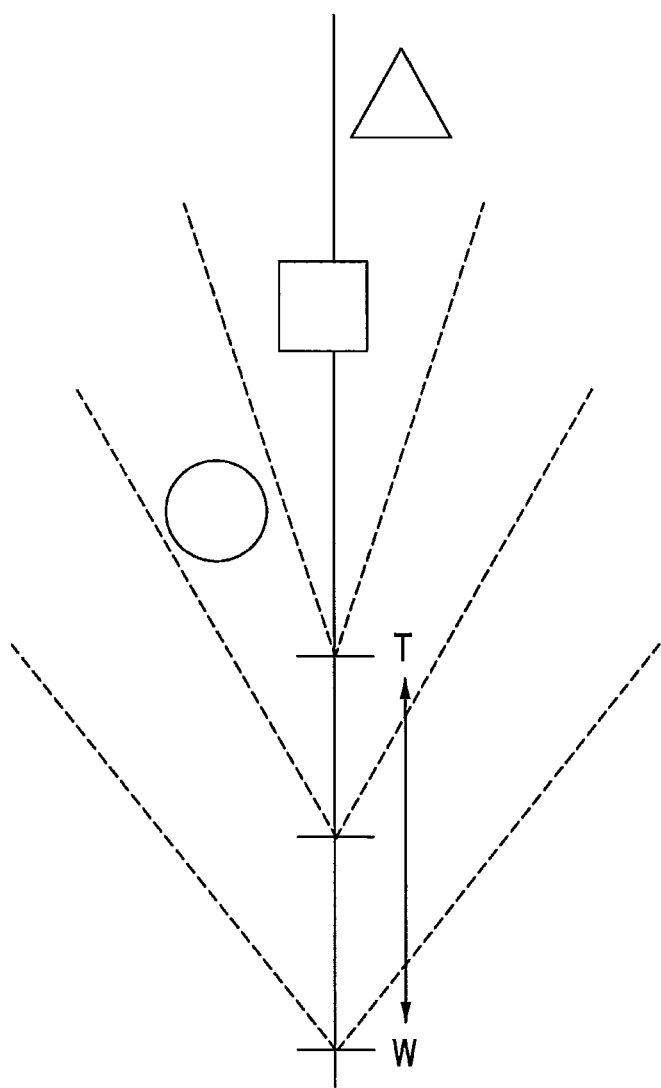
FIG. 10 is a schematic view showing an aspect of stereoscopic image display based on an image after parallax correction.

FIG. 10 is a schematic view showing a stereoscopic image subjected to parallax correction when the stereoscopic image is displayed on the monitor 21.

Since the parallax amount changes such that a viewpoint position approaches a subject (or such that the subject approaches the viewpoint position) when the zoom value is changed from the wide angle W side to the telephoto T side, unnaturalness caused by zoom is improved.

Figure 11:
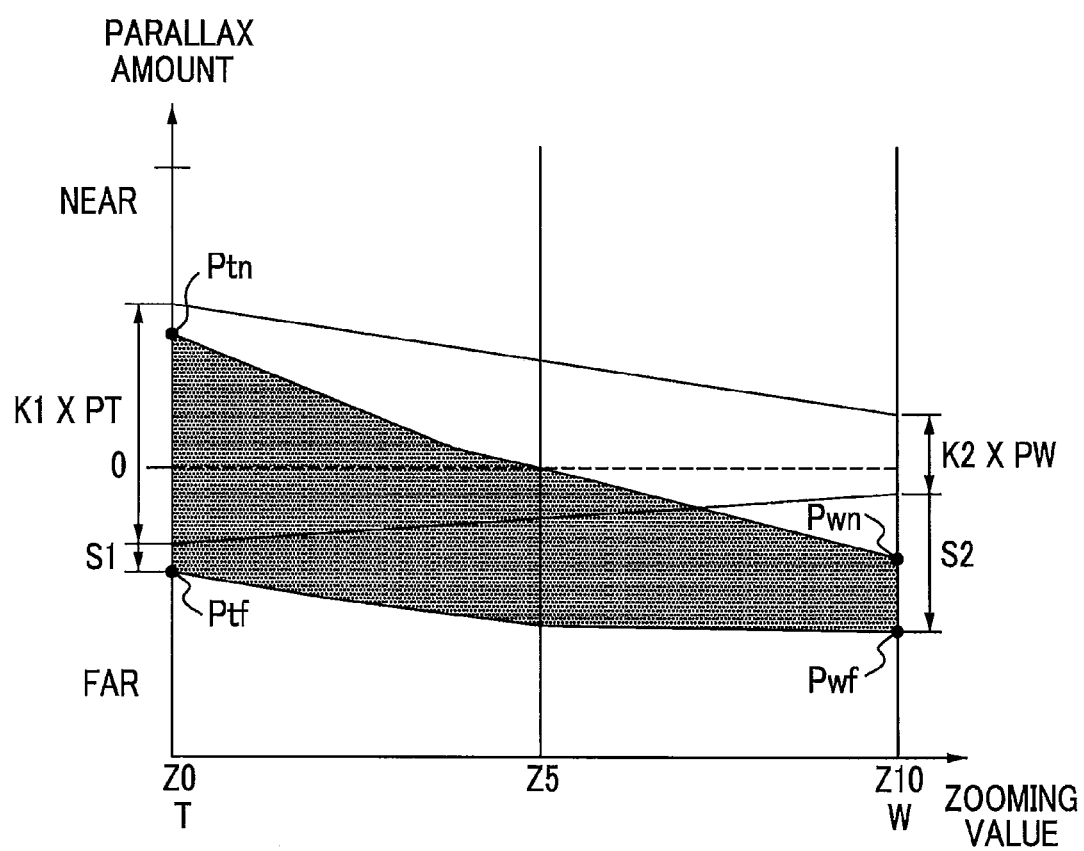
FIG. 11 is a view showing the correspondence relationship between zoom values and parallax amounts of an image when parallax correction is nonlinearly performed.

FIG. 11 shows a case where the lines of Ptf-Pwf and Ptn-Pwn are nonlinear, and the closer to the T (telephoto) end, the more the amount of a change in the parallax amount to the amount of a change in the zoom value increases. That is, the closer to the T end, the greater the movement distance of a subject in the depth direction becomes. Thereby, the movement condition of a subject becomes closer to reality.

The correction value to be used for the parallax amount correction may be determined on the basis of a user setting value. For example, input or selection of the size (display screen size) of the monitor 21 (stereoscopic viewing display device) to which a stereoscopic image is output is received by the operation unit 16. This is because the limit value of the parallax divergence is determined depending on the display screen size.

FIG. 12 shows the correspondence relationship between display sizes and pixels in a monitor having a resolution of 1920×1080 dots.

Additionally, a unit that receives input or selection of the interocular distance for each user may be provided by the operation unit 16. If a child is targeted as an observer of a stereoscopic image, the interocular distance is about 5 cm, and the number of pixels equivalent to a monitor size of 5 cm is set as a parallax amount lower limit Pwf.

About 57 pixels are set as the parallax amount upper limit Ptn, for example, when viewing and listening at a distance of 3 times the screen height of a monitor is assumed. Since this Ptn is determined from the allowable range of the stereoscopic viewing fusion, there is a difference between individuals. Thus, it is preferable that the Ptn can be changed by user setting.

According to the present embodiment, a sense of discomfort of an observer during variable zoom can be improved, and fatigue of stereoscopic viewing can be suppressed. It is preferable to perform the parallax amount correction on a change in the zoom value from the wide angle end to the telephoto end to reduce excessive parallax and a divergence state.

Second Embodiment

Next, a second embodiment will be described. In the second embodiment, the amount of a change in the parallax amount to the amount of a change in the zoom value is increased, whereby a zooming effect is emphasized, and simultaneously excessive parallax or parallax divergence are prevented.

Figure 13:
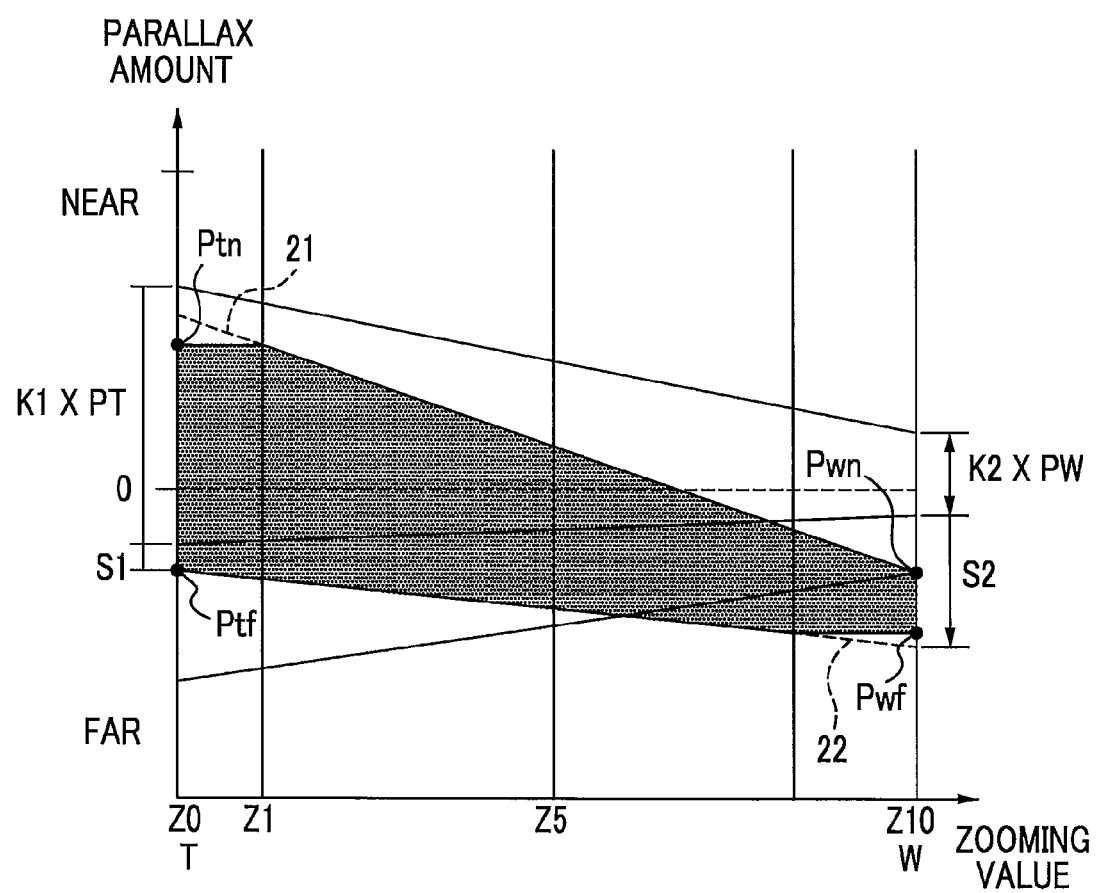
FIG. 13 is a view showing the correspondence relationship between zoom values and parallax amounts of a viewpoint image after parallax correction in a second embodiment.

FIG. 13 shows the correspondence relationship (referred to as "parallax distribution") between zoom values and parallax amounts in viewpoint images by the parallax amount correcting unit 20 of the second embodiment.

In order to emphasize zooming, it is preferable to further the inclination of each of the lines Ptf-Pwf and Ptn-Pwn, thereby increasing the amount of a change in the parallax amount to the amount of a change in the zoom value. That is, the travel distance of a stereoscopic image of a subject in the depth direction to the amount of a change in the zoom value becomes large. As a result, it is possible to emphasize the effect of zooming.

In that case, as shown by dotted lines 21 and 22 in FIG. 13 on the telephoto (T) side or the wide angle (W) side, there is a high possibility of the parallax amount after correction exceeding the parallax amount upper limit Ptn or becomes less than the parallax amount lower limit Pwf.

Thus, the parallax amount correcting unit 20 corrects the amount of correction such that the parallax amount after correction falls within a range of the parallax amount upper limit Ptn to the parallax amount lower limit Pwf. For example, when the zoom value acquired by the operation unit 16 is smaller than Z1 and the parallax amount before correction exceeds Ptn, the parallax amount after correction is fixed to Ptn. Additionally, when the zoom value acquired by the operation unit 16 is larger than a specific zoom value Z8, and the parallax amount before correction is less than Pwf, the parallax amount after correction is fixed to Pwf.

Figure 14:
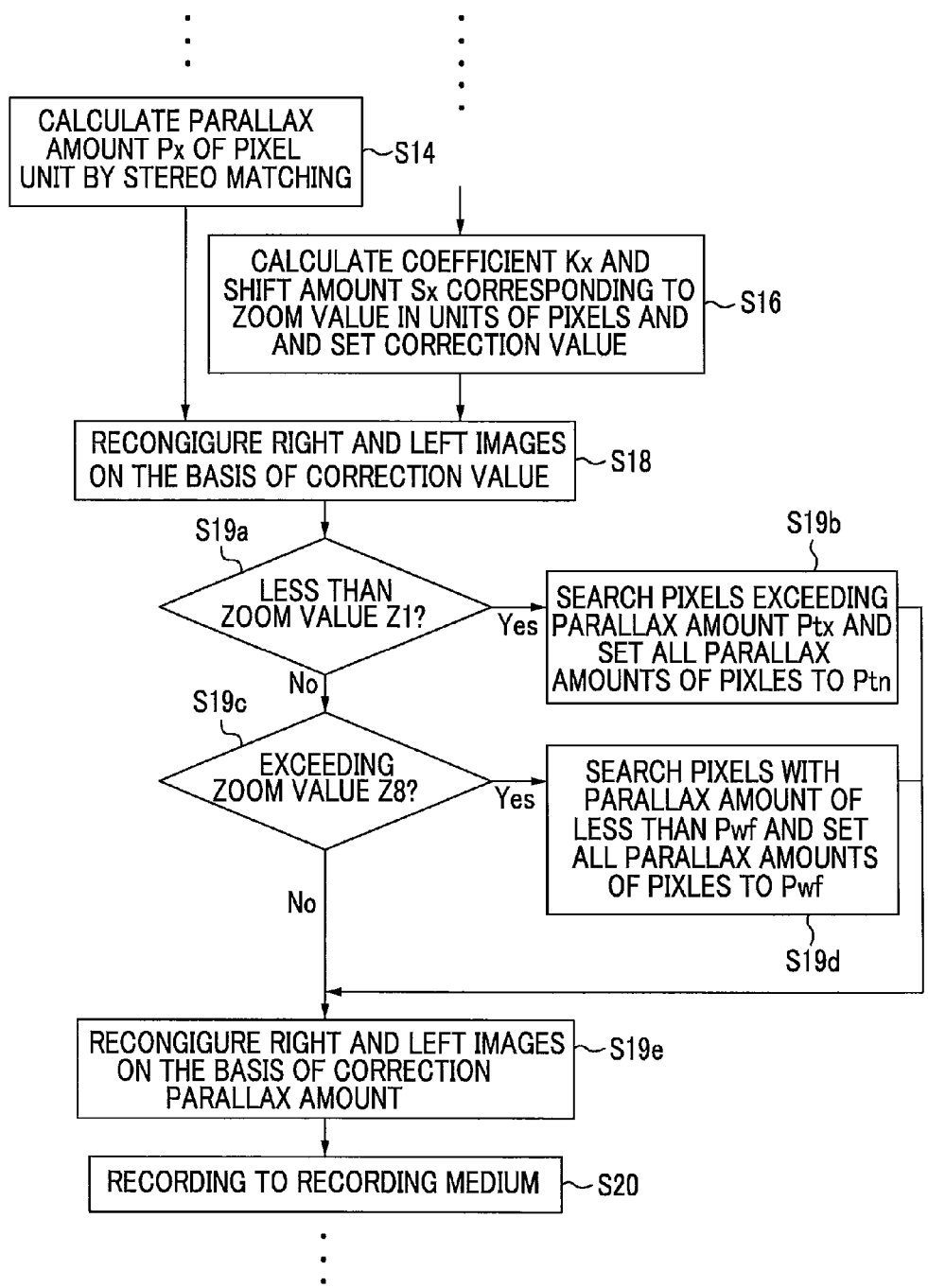
FIG. 14 is a flowchart of essential parts showing the flow of an example of image processing in the second embodiment.

FIG. 14 is a flowchart showing essential parts of the flow of the image processing in the present embodiment.

In addition, as shown in FIG. 2, Steps S2 to S18 are performed similarly to the first embodiment. In Step S18, calculation (primary correction) the parallax amount is performed on the basis of the correction value by the parallax amount correcting unit 20, but this processing is the same processing as Step S18 of FIG. 2.

In Step S19a, it is determined whether or not the zoom value is less than Z1. If the zoom value is less than Z1, in Step S19b, the pixel of the parallax amount exceeding the parallax amount upper limit Ptn is searched, and all the parallax amounts of the pixels are set to Ptn. Additionally, in Step S19c, whether or not the zoom value exceeds Z8. If the zoom value exceeds Z8, in Step S19d, the pixels of which the parallax amount is less than the parallax amount lower limit Pwf are searched, and all the parallax amounts of the pixels are set to Pwf. That is, in Steps S19a to S19d, the parallax amounts deviating from the range of Ptn or Pwf among parallax amounts within a parallax map immediately after the correction of Step S18 is set to Ptn or Pwf.

In Step S19e, the parallax amount correcting unit 20 performs reconfiguration (secondary correction) of the left eye image and the right eye image on the basis of a secondary correction value.

Steps after Step S20 are the same as steps after Step S20 shown in FIG. 2.

Figure 15:
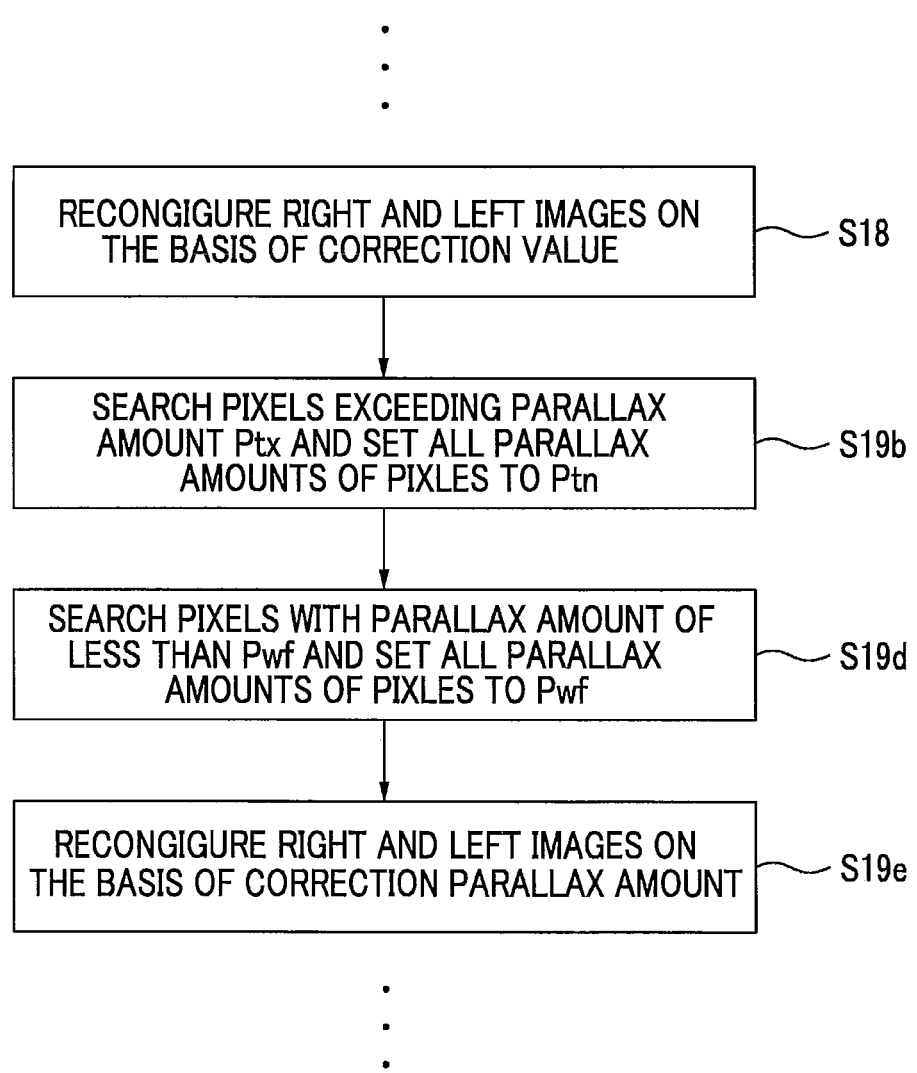
FIG. 15 is a flowchart of essential parts showing the flow of another example of image processing in the second embodiment.

As shown in the flowchart of FIG. 15, such processing may be performed in all the zoom areas regardless of the zoom value. That is, Steps S19b, S19d, and S19e shown in FIG. 14 are executed in this order after Step S18.

Figures 16, 16A, 16B, 16C:
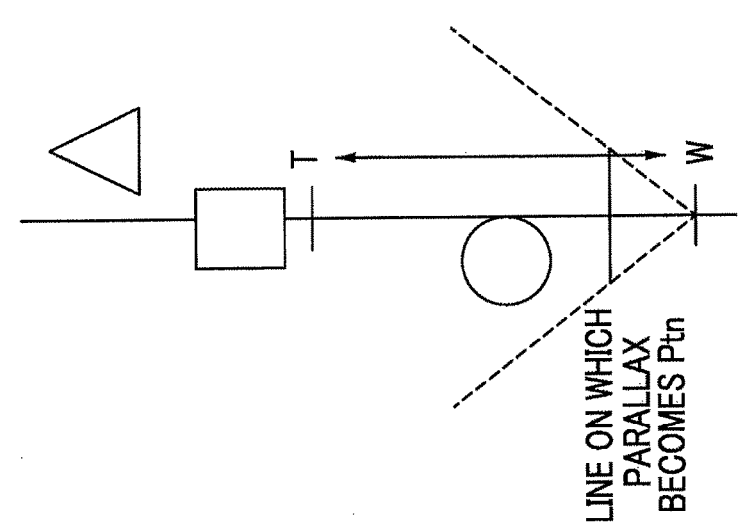
FIGS. 16A to 16c are schematic views schematically showing the state of a stereoscopic image of a subject during zooming.

FIGS. 16A, 16B, and 16C schematically shows the state of a stereoscopic image of a subject in a case where the parallax amount exceeds Ptn when the zoom value is changed in the telephoto direction. FIG. 16C shows that, if the parallax amount exceeds Ptn, the subject image 15 looks planar. Additionally, FIG. 16B shows a case where a polygonal line between Ptn-Pwn of FIG. 21 is smoothed. As the zoom value becomes larger, the subject image becomes gradually planar (that is, the distance difference between the front end and rear end of the subject image is gradually compressed).

In a graph showing the correspondence relationship between zoom values and parallax amounts as shown in FIG. 13, the inclination of lines of the same subject distance, such as Ptn-Pwn and Ptf-Pwf may receive setting input operations from a user and may be made variable, as the emphasis level of a zoom feeling.

In that case, according to the emphasis level set by the user setting, the larger the emphasis level, the more the inclination on the lines (Ptn-Pwn, Ptf-Pwf, and the like) of the same subject distance increases. As this inclination becomes larger, the value of Ptf with a sign becomes larger, and the value of Pwn with a sign becomes smaller. In addition, Ptf≥Pwf and Ptn>Pwn are satisfied.

According to the present embodiment, the zooming effect can be emphasized, and simultaneously, excessive parallax and parallax divergence can be prevented.

Third Embodiment

Figure 17:
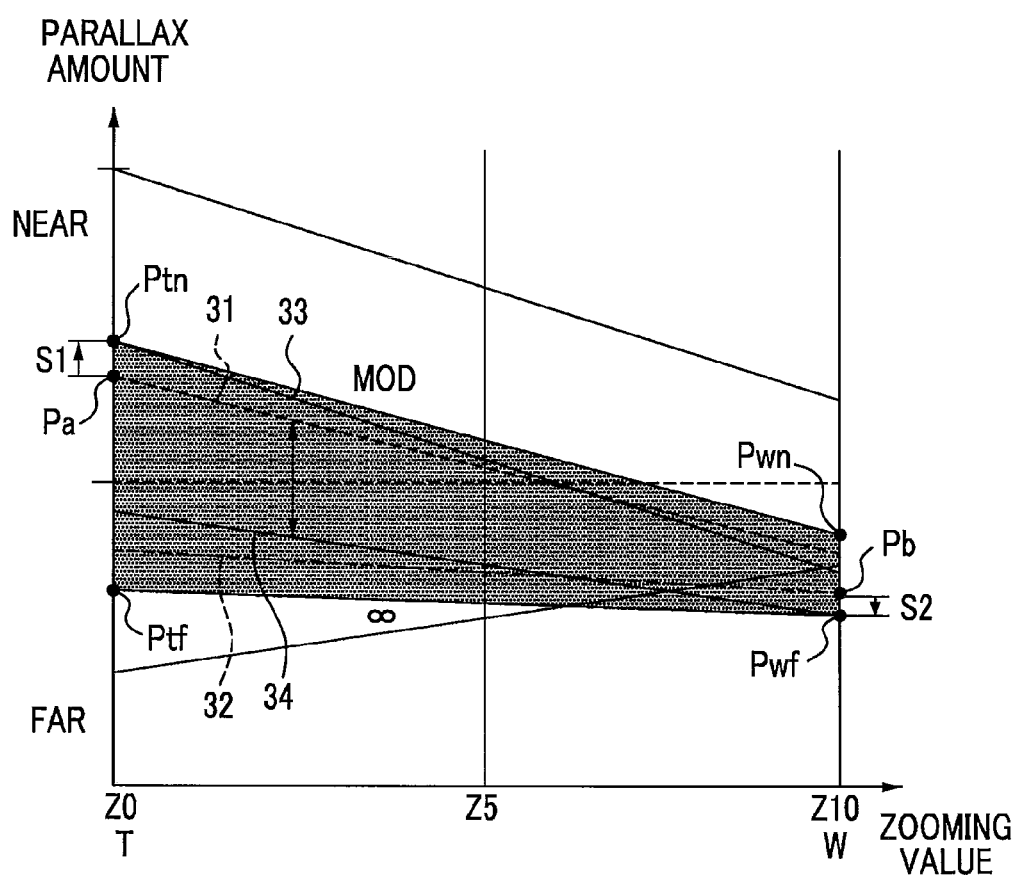
FIG. 17 is a view showing the correspondence relationship between zoom values and parallax amounts of a viewpoint image after parallax correction in a third embodiment.

In actual photographing, the range of the subject distance may be narrow. For example, in indoor photographing, there is no subject at infinity. In photographing over a fence, a net, or the like, a close range becomes a range farther than MOD (shortest focus distance). In that case, the distribution of the parallax amount after correction falls, for example, within a range between a dotted line 31 of FIG. 17 and a dotted line 32. In such a case, since there is margin from a maximum value Pa and a minimum value Pb to a limit value (Ptn and Pwf) in actual parallax distribution, the margin can be allocated to the emphasis of the zooming effect.

Specifically, the shift amounts S1 and S2 of the parallax correction may be adjusted such that the maximum value Pa becomes the upper limit Ptn and the minimum value Pb becomes the lower limit Pwf. As a result, the parallax distribution is changed to a range between a solid line 33 and a solid line 34 from the range between the dotted line 31 and the dotted line 32 after parallax correction, and the inclination on a line showing the correspondence relationship between zoom values and parallax amounts in the same subject distance becomes large.

In the present embodiment, input of setting information for determining a parallax correction value to be used for correction of a parallax amount is received by the operation unit 16. The parallax amount correction value calculating unit 19 calculates the parallax amount correction value on the basis of the input setting information.

The setting information is, for example, the display size (monitor size) of the monitor 21.

The setting information may be, for example, at least one of subject distance information on the nearest subject, and subject distance information on the farthest subject.

Additionally, the zoom value may be set to the telephoto end or the wide angle end by the control of the control unit 25, and the parallax amount correction value may be calculated on the basis of the parallax amount of a focused pixel by the parallax amount correction value calculating unit 19.

Additionally, input of zoom effect setting information for determining the amount of a change in the parallax amount to the amount of a change in the zoom value may be received by the operation unit 16, and the parallax amount correction value may be calculated on the basis of the input zoom effect setting information by the parallax amount correction value calculating unit 19.

Figure 18:
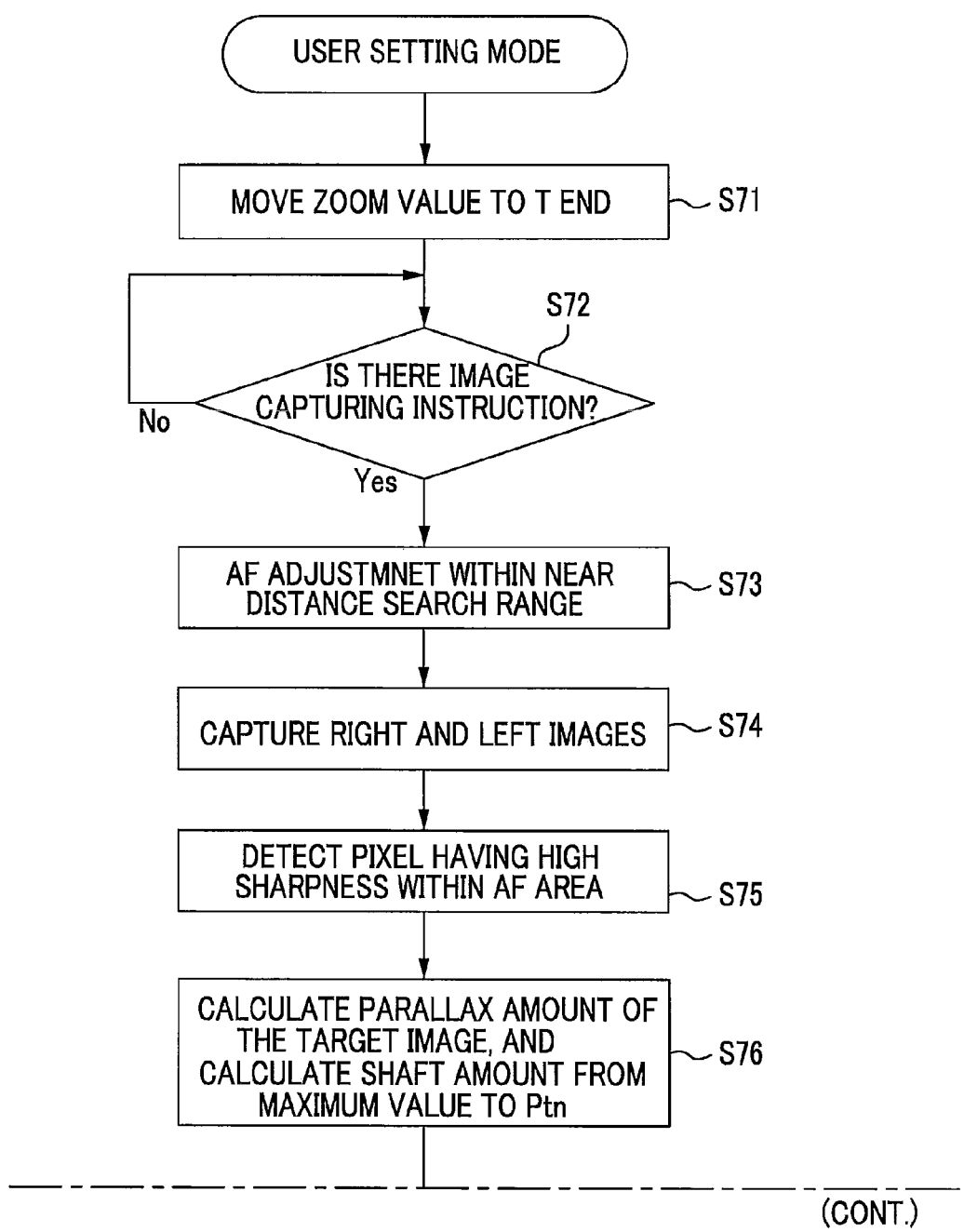
FIG. 18 is a flowchart showing the flow of an example of user setting processing.

FIG. 18 is a flowchart showing the flow of an example of user setting processing.

If a user program mode is set in FIG. 18, the zoom value (zoom position) of the imaging lenses 11L and 11R are first moved (set) to the T end (Step S71), a subject with the nearest subject distance among subjects to be photographed is guided to a user by the monitor 21 so as to fall within an AF area, and an image capturing instruction operation is received by the operation unit 16 (Step S72). If an image capturing instruction is received, a focal position is found from the close range side by the priority of a short distance range (Step S73). That is, the nearest subject among the subjects to be photographed is focused on. Next, a left eye image and a right eye image is captured (Step S74), pixels of which the sharpness is higher than a preset threshold within the AF area are detected (Step S75), and the parallax amounts of the pixels are calculated to determine the parallax amount maximum value Pa, and the shift amount (Ptn-Pa) from the parallax amount maximum value Pa to Ptn is calculated (Step S76).

Next, the zoom value (zoom position) of the imaging lenses 11L and 11R are first moved (set) to the W end (Step S81), a subject with the farthest subject distance among subjects to be photographed is guided to a user by the monitor 21 so as to fall within the AF area, and an image capturing instruction operation is received by the operation unit 16 (Step S82). If an image capturing instruction is received, a focal position is found from the farthest range by the priority of a long distance range (Step S83). That is, the farthest subject among the subjects to be photographed is focused on. Next, a left eye image and a right eye image is captured (Step S84), pixels of which the sharpness is higher than a preset threshold within the AF area are detected (Step S85), and the parallax amounts of the pixels are calculated to determine the parallax amount minimum value Pb, and the shift amount (Pb-Pwf) from the parallax amount minimum value Pb to Pwf is calculated (Step S86).

In addition, since the stereo matching is performed when the parallax amount is obtained, the matching precision of an image with a higher sharpness is improved, and the precision of the parallax amount is also improved.

In the above setting method, the shift amounts of the parallax amounts are calculated at both the telephoto end and the wide angle end. However, the invention is not limited to such a case, and the shift amount of the parallax amount may be calculated at one of the telephoto end and the wide angle end.

Additionally, direct input operations (or selection input operations) of the subject distance information (the minimum subject distance) on the nearest subject, and the subject distance information (the maximum subject distance) on the farthest subject may be received from a user by the operation unit 16.

Input of zoom effect setting information for determining the amount of a change in the parallax amount to the amount of a change in the zoom value may be received by the operation unit 16, and the parallax amount correction value may be calculated on the basis of the input zoom effect setting information by the parallax amount correction value calculating unit 19.

Figure 19:
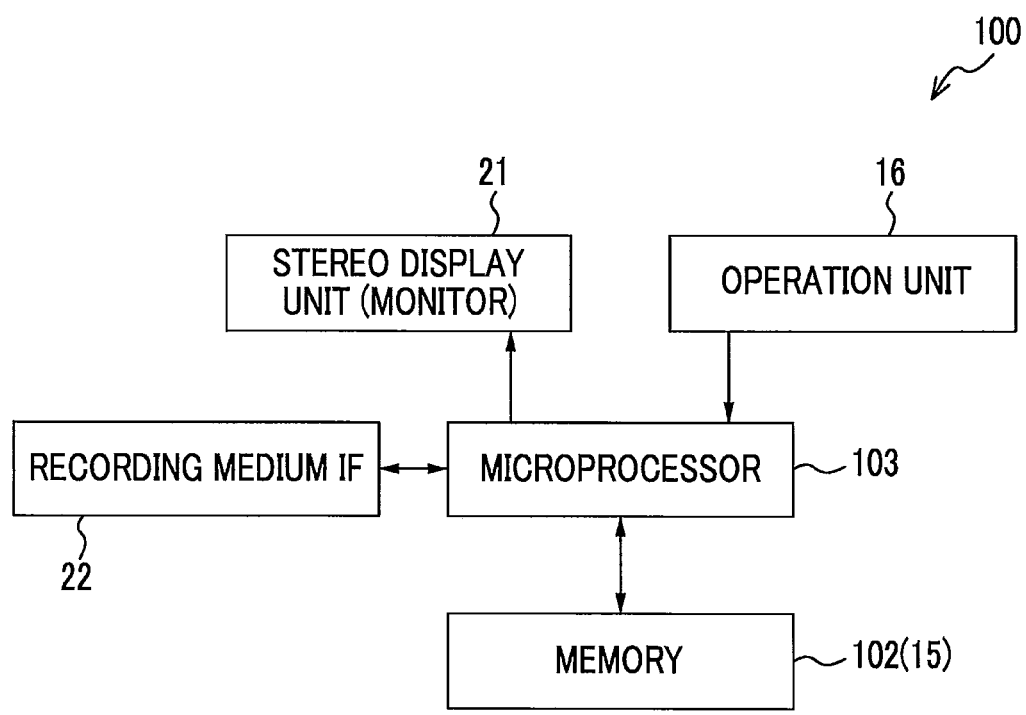
FIG. 19 is a block diagram showing a hardware configuration of a computer apparatus to which the invention is applied.

In addition, although the case where the invention is applied to an imaging device has been described as an example, the invention is not particularly limited to such a case. For example, the invention may be applied to a computer apparatus 100 shown in FIG. 19. In FIG. 19, the same reference numerals are given to the constituent elements shown in FIG. 1.

A personal computer apparatus 100 shown in FIG. 19 includes the operation unit 16, a stereoscopic display unit 21 (monitor), the recording medium interface 22, a memory 102, and a microprocessor 103. The microprocessor 103 has the functions of the electronic zoom processing unit 17, the parallax amount calculating unit 18, the parallax amount correction value calculating unit 19, the parallax amount correcting unit 20, and the control unit 25 of FIG. 1. The memory 102 has the function of the image memory 15 of FIG. 1.

The invention is limited to neither the example described in the present specification nor the example shown in the drawings, and it is needless to say that various kinds of design changes or improvements may be performed without departing from the concept of the invention.

What is claimed is:

1. An image processing device comprising:
   an image acquisition part that acquires a stereoscopic image including a plurality of viewpoint images;
   a zoom value acquisition part that acquires a zoom value;
   an electronic zoom part that performs magnification of the stereoscopic image acquired by the image acquisition part through image processing on the basis of the zoom value acquired by the zoom value acquisition part;
   an output part capable of outputting the stereoscopic image magnified by the electronic zoom part; and
   a control part that outputs the stereoscopic image immediately before or immediately after a change in the zoom value to the output part as a stereoscopic still image magnified by the electronic zoom part while the zoom value acquired by the zoom value acquisition part is varying, and outputs the stereoscopic image acquired by the image acquisition part to the output part as a stereoscopic moving image while the zoom value is not varying.

2. The image processing device according claim 1, wherein the control part makes the display time of the magnified still image longer than a fluctuation period of the zoom value.

3. The image processing device according to claim 1, wherein the control part gradually changes the zoom value to gradually output a magnified stereoscopic still image by the output part.

4. The image processing device according to claim 3, wherein the control part performs switching of the stereoscopic still image through fade-in and fade-out of an image.

5. The image processing device according to claim 1, further comprising:
   a parallax amount calculating part that calculates the parallax amount of each pixel among the plurality of viewpoint images; and
   a parallax amount correcting part that corrects the parallax amounts of at least some pixels of the stereoscopic image acquired by the image acquisition part, according to the parallax amount calculated by the parallax amount calculating part and the zoom value acquired by the zoom value acquisition part,
   wherein the stereoscopic still image of which the parallax amount is corrected by the parallax amount correcting part is output by the output part.

6. The image processing device according to claim 1, wherein the parallax amount correcting part performs the correction of changing the amount of a change in the parallax amount to the amount of a change in the zoom value per unit, on the plurality of viewpoint images.

7. The image processing device according to claim 6, wherein the parallax amount correcting part corrects the parallax amount such that the parallax amount of a subject with the same subject distance decreases if the zoom value changes from the wide angle side toward the telephoto side in the stereoscopic image before correction, and the parallax amount of the subject with the same subject distance increases or becomes constant if the zoom value changes from the wide angle side toward the telephoto side in the stereoscopic still image after correction.

8. The image processing device according to claim 5, wherein the parallax amount correcting part multiplies the parallax amount before correction by a coefficient and shifts the parallax amount after the multiplication, to correct the parallax amount.

9. The image processing device according to claim 8, wherein the parallax amount correcting part corrects the parallax amount such that the shift amount of the parallax amount becomes large from a telephoto end to a wide angle end.

10. The image processing device according to claim 5, wherein the parallax amount correcting part corrects the parallax amount such that the parallax amount of a subject with the same subject distance increases non-linearly if the zoom value changes from a wide angle end to a telephoto end.

11. The image processing device according to claim 5, wherein the parallax amount correcting part corrects the parallax amount so as to fall within a range of specific upper limit to a specific lower limit.

12. The image processing device according to claim 5, further comprising:
a setting information input part that receives input of setting information for determining a parallax amount correction value to be used for the correction of the parallax amount; and
a parallax amount correction value calculating part that calculates the parallax amount correction value on the basis of the setting information input by the setting information input part.

13. The image processing device according to claim 12, wherein the setting information is the display size of the stereoscopic image.

14. The image processing device according to claim 5, further comprising a parallax amount correction value calculating part that sets the zoom value to a telephoto end or a wide angle end, and calculates the correction value of the parallax amount on the basis of the parallax amount of a focused pixel.

15. The image processing device according to claim 12, wherein the setting information includes at least one of subject distance information on a nearest subject and subject distance information on a farthest subject.

16. The image processing device according to claim 5, further comprising:
a zoom effect setting information input part that receives input of zoom effect setting information for determining the amount of a change in the parallax amount to the amount of a change in the zoom value per unit; and
a parallax amount correction value calculating part that calculates the parallax amount correction value on the basis of the zoom effect setting information input by the setting information input part.

17. An imaging device comprising the image processing device according to claim 1,
wherein the image acquisition part includes an imaging lens including a zoom lens, and an imaging element that captures a subject image focused by the imaging lens.

18. An image processing method using an image acquisition part that acquires a stereoscopic image including a plurality of viewpoint images, a zoom value acquisition part that acquires a zoom value, an electronic zoom part that performs magnification of the stereoscopic image acquired by the image acquisition part through image processing on the basis of the zoom value acquired by the zoom value acquisition part, and an output part capable of outputting the stereoscopic image,
wherein the stereoscopic image immediately before or immediately after a change in the zoom value is output to the output part as a stereoscopic still image magnified by the electronic zoom part while the zoom value acquired by the zoom value acquisition part is varying, and the stereoscopic image acquired by the image acquisition part is output to the output part as a stereoscopic moving image while the zoom value is not varying.

* * * * *